United States Patent
Wada et al.

(10) Patent No.: US 9,855,627 B2
(45) Date of Patent: Jan. 2, 2018

(54) REGENERATING METHOD OF CUTTING BLADE, ITS REGENERATING EQUIPMENT, AND CUTTING BLADE FOR SHEARING TYPE GRINDING MACHINE

(71) Applicant: Kabushiki Kaisha Kinki, Hyogo (JP)

(72) Inventors: Naoya Wada, Hyogo (JP); Yasuhiko Honda, Hyogo (JP); Yoshinobu Azui, Hyogo (JP); Isao Nagai, Hyogo (JP); Tetsuo Yasukawa, Hyogo (JP); Katsu Matsumoto, Hyogo (JP); Keita Takami, Hyogo (JP); Natsuki Takemoto, Hyogo (JP)

(73) Assignee: KABUSHIKI KAISHA KINKI, Hyogo (JP)

( * ) Notice: Subject to any disclaimer, the term of this patent is extended or adjusted under 35 U.S.C. 154(b) by 21 days.

(21) Appl. No.: 13/761,556

(22) Filed: Feb. 7, 2013

(65) Prior Publication Data
US 2014/0215787 A1 Aug. 7, 2014

(51) Int. Cl.
| | |
|---|---|
| *B23K 9/04* | (2006.01) |
| *B23P 6/00* | (2006.01) |
| *B02C 18/18* | (2006.01) |
| *B23P 23/04* | (2006.01) |

(52) U.S. Cl.
CPC ................ *B23P 6/00* (2013.01); *B02C 18/18* (2013.01); *B23K 9/044* (2013.01); *B23P 23/04* (2013.01); *Y10T 29/49746* (2015.01); *Y10T 29/5176* (2015.01)

(58) Field of Classification Search
CPC ..... B23P 6/00; B21K 19/02; Y10T 29/49726; Y10T 29/49728; Y10T 497/32; Y10T 497/49737; Y10T 497/49742; Y10T 497/49746; B23K 9/042; B23K 9/044; B23K 10/27; B23K 11/0013; B23K 26/342; B23K 15/0086; B23K 20/1215; B23K 25/005; B23K 5/18
See application file for complete search history.

(56) References Cited

U.S. PATENT DOCUMENTS

| | | | | | |
|---|---|---|---|---|---|
| 1,548,613 | A | * | 8/1925 | Kieser ..................... | F01D 5/141 29/889.21 |
| 6,532,656 | B1 | * | 3/2003 | Wilkins et al. .............. | 29/889.1 |
| 7,140,106 | B1 | * | 11/2006 | Reynolds .................. | B23P 6/00 29/402.06 |

FOREIGN PATENT DOCUMENTS

| | | |
|---|---|---|
| JP | 9-234384 | 9/1997 |
| JP | 2001-170849 | 6/2001 |
| JP | 2010-131510 | 6/2010 |

\* cited by examiner

*Primary Examiner* — Christopher Besler
(74) *Attorney, Agent, or Firm* — Wenderoth, Lind & Ponack, L.L.P.

(57) ABSTRACT

A regenerating method of a cutting blade to be repaired includes a chamfering step of chamfering a leading edge part and side edge parts of a cutting blade, a build-up welding step of welding a build-up on the chamfered leading edge part and the chamfered side edge parts, and a processing step of regenerating and processing build-up welding portions of the cutting blade into a specified shape of the leading edge part and the side edge parts, and of the build-up welding portions formed on the side edge parts, such that a dimension L1 of a lateral build-up weld zone is 1 to 3 times a dimension L2 of an outer build-up weld zone.

17 Claims, 27 Drawing Sheets

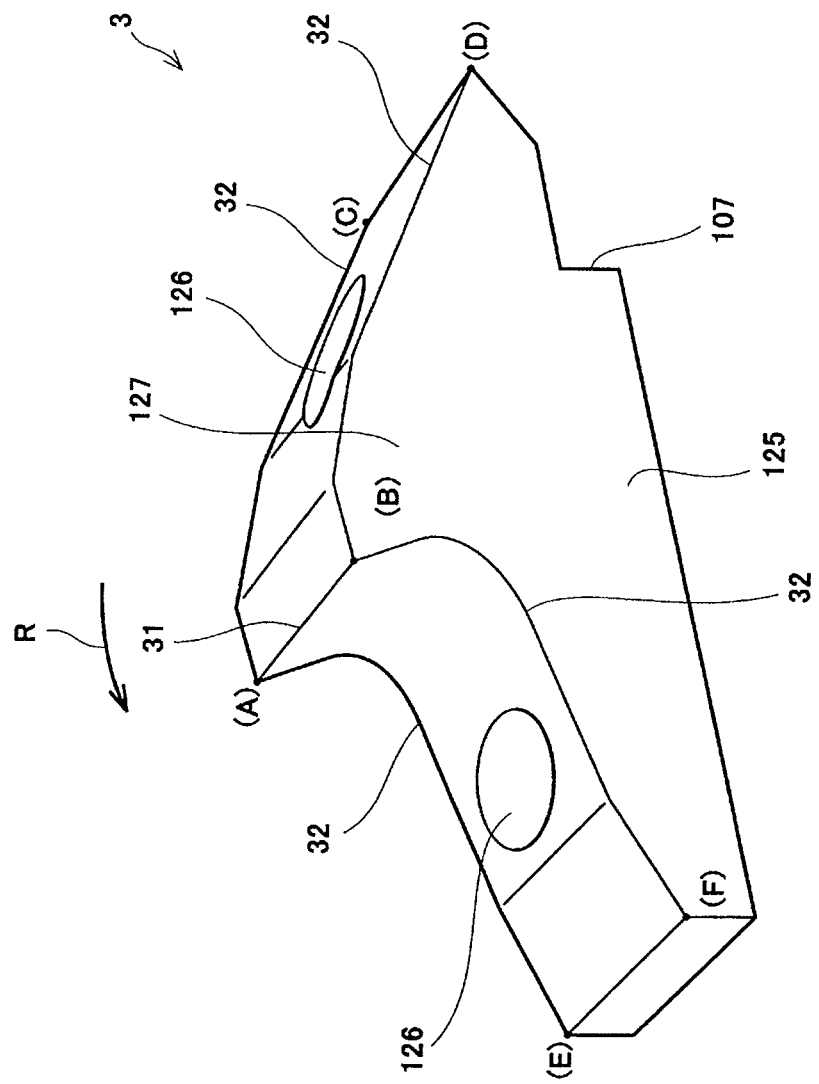

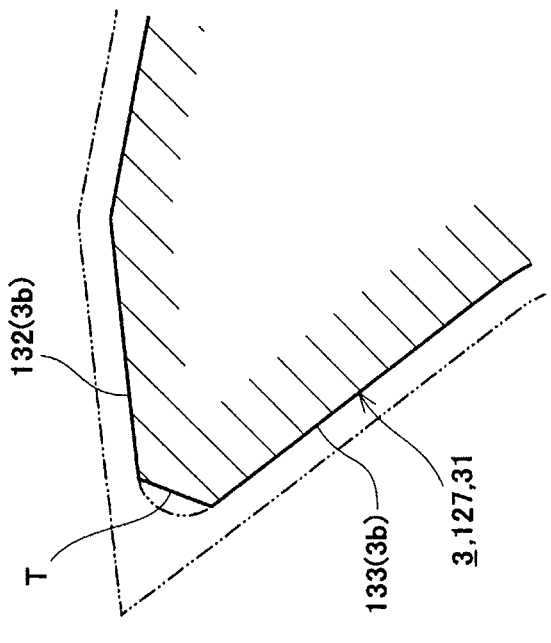
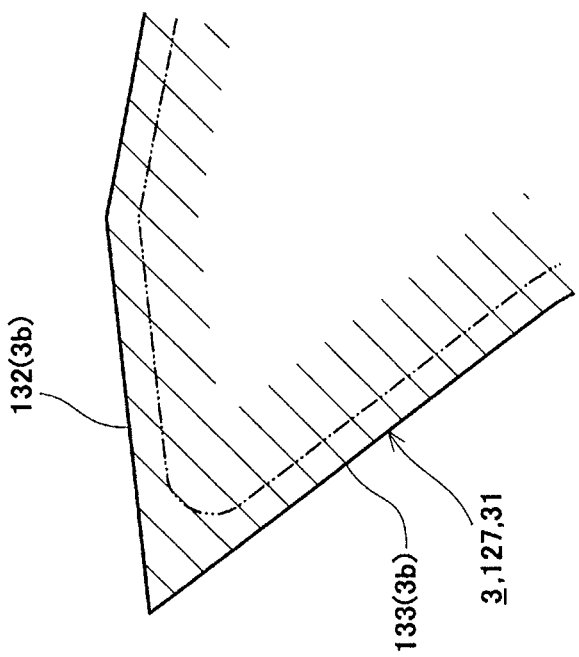

F I G. 9

| | | Width dimension W of blade tip of cutting blade (mm) | Reference line (or reference plane) K |
|---|---|---|---|
| Group | A | Less than W1 to W2 or more | K1 |
| | B | Less than W2 to W3 or more | K2 |
| | C | Less than W3 to W4 or more | K3 |
| | D | Less than W4 to W5 or more | K4 |
| | E | Less than 5 | Build-up welding not applicable |

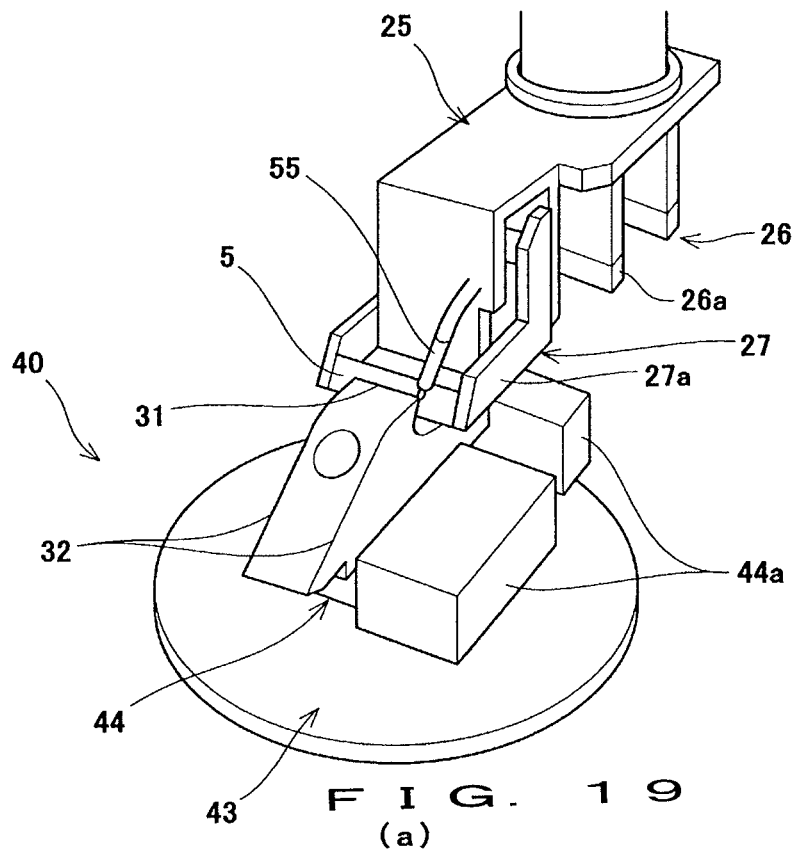
F I G. 1 9
(a)
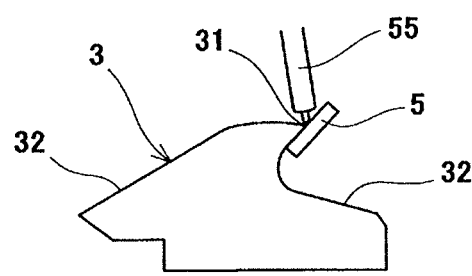
F I G. 1 9
(b)

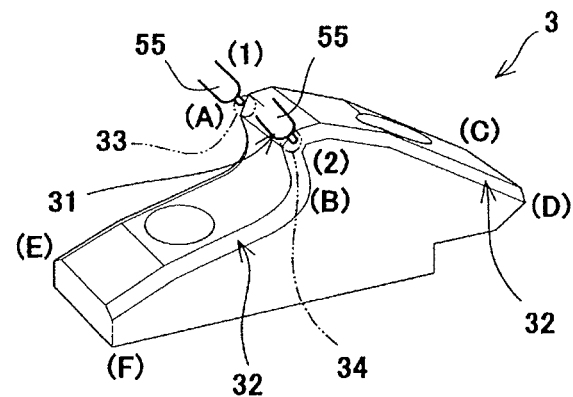
F I G. 2 0 (a)
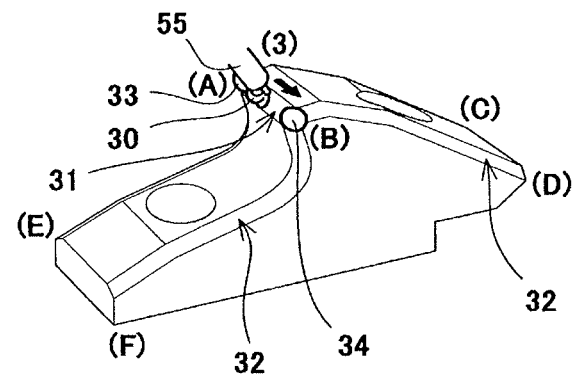
F I G. 2 0 (b)
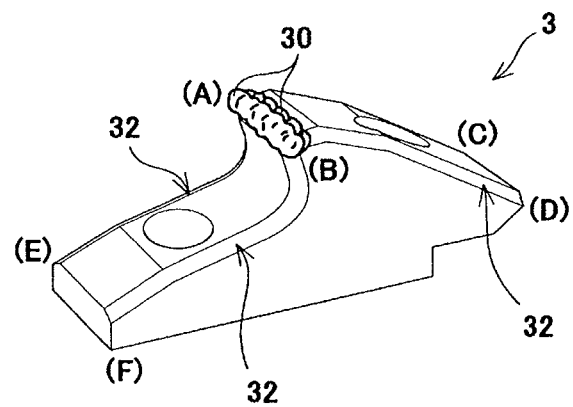
F I G. 2 0 (c)

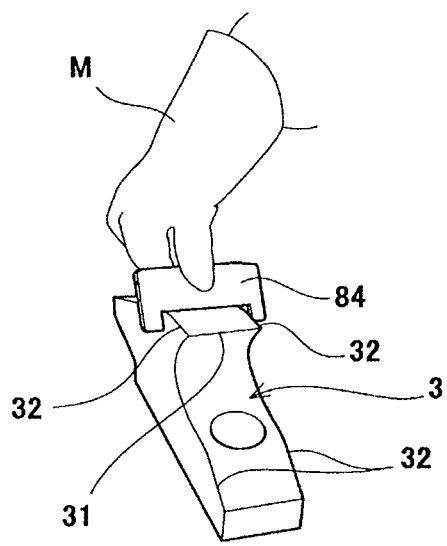
F I G. 2 6 (a)
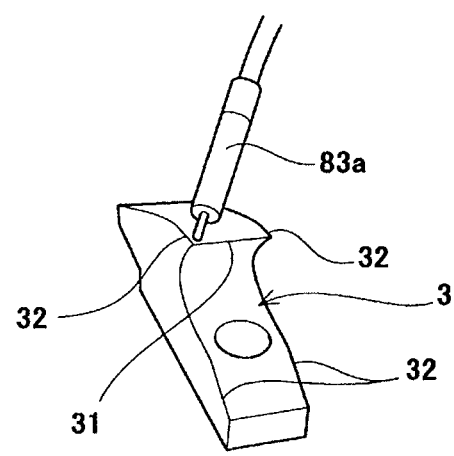
F I G. 2 6 (b)

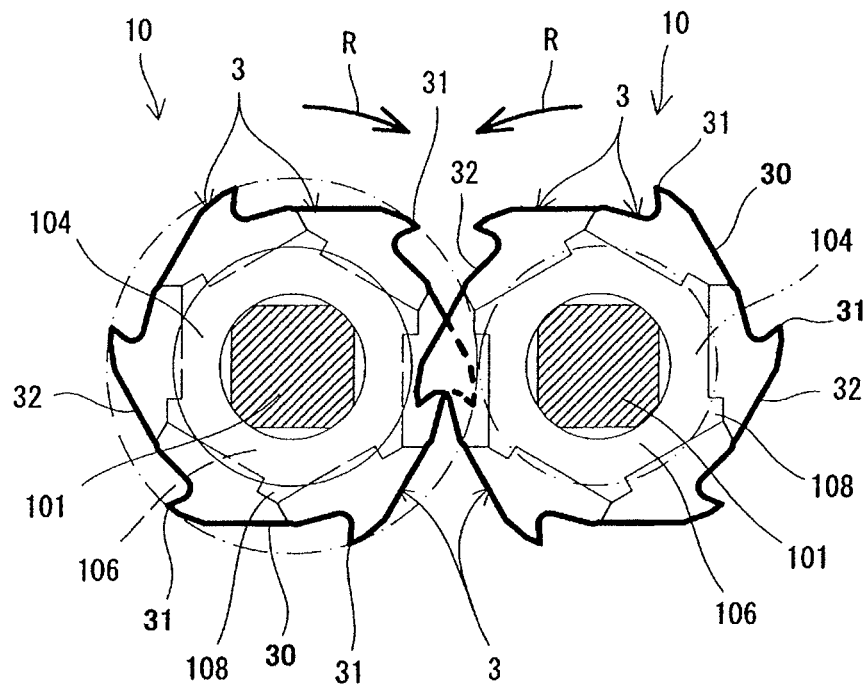
F I G. 2 8 (a)
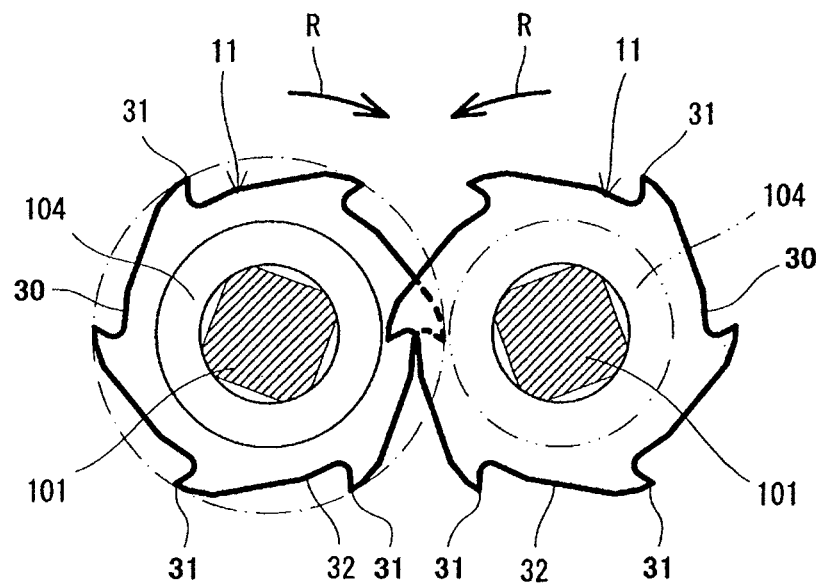
F I G. 2 8 (b)

REGENERATING METHOD OF CUTTING BLADE, ITS REGENERATING EQUIPMENT, AND CUTTING BLADE FOR SHEARING TYPE GRINDING MACHINE

BACKGROUND OF THE INVENTION

[Technical Field]

The present invention relates to a regenerating method of a cutting blade used in shearing type grinding machine or the like, its regenerating equipment, and a cutting blade for a shearing type grinding machine.

[Background Art]

Conventionally, a shearing type grinding machine is known as a machine for shearing and grinding plastics, wood, paper, metal, rubber, fiber, leather, and other solid matter. For example, this type of shearing and grinding machine includes a shearing type grinding machine proposed previously by the present applicant (see patent document 1).

As shown in a side sectional view of a shearing type grinding machine in FIG. 29 and a sectional view of A-A in FIG. 30, this shearing type grinding machine 100 has a plurality of rotary blades 103 mounted in the axial direction of rotational shafts 101, 102, alternately across spacers 104. The spacer 104 is formed in an outside diameter so that the base part of the rotary blade 103 may be positioned in the axial direction as shown in FIG. 29, so that the rotary blade 103 is positioned in the axial direction, and mounted detachably.

These rotary blades 103 include, as shown in FIG. 29, a blade rest 106 detachably mounted on the rotational shafts 101, 102, and a split type cutting blade 105 detachably provided so as to surround the blade rest 106, and between mutually opposite side planes of the rotary blades rotating in the rotation direction R side, the mutual cutting blades 105 are disposed in an overlapped state to be engaged with each other, at a gap of, for example, 0.5 to 1 mm in the axial direction. The cutting blades 105 provided on the outer circumference of the rotary blades 103 attract the grinding objects 120, and grind the grinding objects 120 by a shearing action between mutually opposite rotary blades 103.

An engaging step 107 is formed on a mounting surface of the cutting blade 105, and this engaging step 107 is engaged with an engaging protrusion 108 provided on the blade base 106, and receives a grinding reaction. This split type cutting blade 105 includes a leading edge part 109 pointed to the rotating direction of the blade tip projecting outward, and side edge parts 110 (lateral edges) formed along the side outer edges.

These edge parts 109, 110 are worn earlier due to shearing and grinding, but since the cutting blades 105 having these edge parts 109, 110 are of split type, only the cutting blades 105 can be replaced if the edge parts 109, 110 are worn.

In the cutting blades 106 in this type of shearing grinding machine 100, the leading edge part 109 attracts and grinds the grinding objects, and the leading edge part 109 and the side edge parts 110 shear and grind, and hence the leading edge part 109 and the side edge parts 110 are worn earlier.

This early wearing is a phenomenon of abrasion of the leading edge part 109 and the side edge parts 110 becoming dull (round) profile, and this abrasion causes to drop the grinding performance and lower the grinding efficiency. Depending on the grinding objects, the edge parts 109, 110 may be cut off, and such defects may also lead to drop of grinding performance or lowering of grinding efficiency. Accordingly, in the event of such wear or defect (such wear or defect being collectively called abrasion), generally, the cutting blade 105 is replaced with a new one on every occasion.

However, even in the grinding machine having such split type cutting blades 105, since one machine contains tens of cutting blades 105, for example, it takes much cost and labor for replacement.

Moreover, such cutting blades 105 are made of expensive materials such as alloy tool steel in order to enhance the abrasion resistance, and in the case of the shearing type grinding machine 100 having many cutting blades 105, a tremendous cost is needed to renew all of the cutting blades 105. Above all, the resources cannot be used effectively.

PRIOR ART LITERATURE

Patent Document

[Patent document 1] Japanese Patent Application No. 8-323232

Problems to Be Solved by the Invention

As mentioned above, an enormous cost is needed to replace all of the worn cutting blades 105 with new ones, and it is proposed to re-use the cutting blades 105 by building up and welding a hardening build-up welding material on the edge parts 109, 110 of the worn cutting blades 105, and regenerating and processing the build-up welded portions to a specified shape of edge parts 109, 110.

Such regeneration differs in the quality and status of build-up welding depending on the skill of the operators, and finally differs in the finished state, and it is hard to maintain a stable quality. Moreover, it takes much time and labor for regenerating multiple cutting blades 105, and it is nearly impossible to realize.

On the other hand, in the case of regeneration of edge parts of the cutting blades 105 by an automatic machine, since the edge part shape of the cutting blades 105 is formed of the leading edge part 109 pointed to the rotation direction of the blade tip projecting outward, and the side edge parts 110 of a curved shape consecutive to the leading edge part 109, if part of the edge part is broken, the automatic welding machine stops temporarily in this portion (hereinafter called a "short stop"), and the equipment stops for restoration of the present status due to stop and restart for automatic build-up welding, and the production efficiency is lowered. However, in regeneration of cutting blades 105, effective measures for preventing such "short stop" are not known.

The processed and regenerated cutting blade 105 is desired to attract the grinding objects 120 same as a new product, and shear and grind powerfully, and hence the build-up weld zone is supposed to be formed in the entire worn range of the leading edge part 109 and side edge parts 110.

In such manner, much cost is needed in the build-up welding material, and it takes much time and cost in regenerating process of the cutting blade 105.

SUMMARY OF THE INVENTION

The present invention is devised to solve such problems, and it is hence a primary object thereof to present a regenerating method of a cutting blade worn in the leading edge part and side edge parts, for regenerating into a cutting blade of a stable high quality efficiently, by using a minimum of welding materials, its regenerating equipment, and a cutting blade for a shearing type grinding machine.

Means for Solving the Problems

The regenerating method of a cutting blade of the invention is a regenerating method of a cutting blade to be repaired, having a fixed part, and a blade tip projecting outward from this fixed part, the blade tip having a leading edge part pointed toward a rotational direction, and having side edge parts at the side outer edge including the blade tip, including a chamfering step of chamfering the leading edge part and the side edge parts of the cutting blade, a build-up welding step of welding a build-up on the chamfered leading edge part and side edge parts, and a processing step of regenerating and processing build-up welding portions of the cutting blade into a specified shape of leading edge part and side edge parts, in which of the side build-up welding portions formed on the side edge parts, a lateral build-up weld zone extending on the lateral side of the cutting blade is specified in the dimension in a vertical direction on the outer circumference of the main body, from the outer circumference of the main body of the cutting blade, by 1 to 3 times of the dimension in thickness direction of the cutting blade, in an outer build-up weld zone extending on the outer circumference of the cutting blade.

According to the regenerating method of a cutting blade of the invention, first of all, the cutting blade to be repaired is chamfered on the leading edge part and side edge parts (chamfering step). The chamfered leading edge part and side edge parts are built up and welded (build-up welding step). Then the build-up welding portions of the cutting blade are regenerated and processed into a specified shape of leading edge part and side edge parts (regenerating step). In this manner, the cutting blade to be repaired can be regenerated to be reusable.

Of side build-up welding portions formed on the side edge parts, the lateral build-up weld zone extending on the lateral side of the cutting blade is built up and welded in the build-up welding step so that the dimension in the vertical direction to the outer circumference of the main body from the outer circumference of the main body of the cutting blade may be 1 to 3 times of the dimension in thickness direction of the cutting blade, in an outer build-up weld zone extending on the outer circumference of the cutting blade.

Accordingly, the bonding force on the side edge parts of the side build-up weld zone including the lateral build-up weld zone after the regenerating process, and the strength as the blade for exhibiting a shearing force by the lateral build-up weld zone after the regenerating process can be brought closer to or higher than the force of a new cutting blade.

In the regenerating method of a cutting blade of the invention, the lateral build-up weld zone after the regenerating process projects from the side of the cutting blade, and the outer build-up weld zone after the regenerating process can be formed nearly on a same plane as the outer circumference of the main body of the cutting blade.

In this way, when the lateral build-up weld zone after the regenerating process is formed to project from the side of the cutting blade (not forming on the entire side surface), only the portion responsible for function as a blade for shearing and grinding the grinding objects out of the side edge parts can be regenerated by the lateral build-up weld zone. As a result, the material cost for the lateral build-up weld zone can be saved, and time and labor of the regenerating process can be saved.

Further, when the outer build-up weld zone after the regenerating process is formed nearly on a same plane as the outer circumference of the main body of the cutting blade, the outer circumference of the cutting blade can be formed as a smooth flat surface. As a result, when shearing and grinding the grinding objects by rotating the cutting blade, the frictional resistance due to contact between the outer circumference of the cutting blade and the grinding objects, and collision resistance due to collision can be reduced, and the driving energy for rotating the cutting blade can be saved.

In the regenerating method of a cutting blade of the invention, of the leading end build-up weld zone formed in the leading edge part, a relief surface build-up weld zone extending on a relief surface formed at the outside in a radius direction of the rotation of the blade tip is specified in the dimension in a vertical direction to its leading edge from the leading edge of the leading end build-up weld zone, to be larger than the dimension in a vertical direction to the leading edge from the leading edge of the leading end build-up weld zone, in a scooping surface build-up weld zone extending on a scooping surface formed at the inner side of a radial direction of the rotation of the blade tip.

Accordingly, the bonding force on the leading edge parts of the side build-up weld zone including the relief surface build-up weld zone after the regenerating process, and the attracting strength attracting the grinding objects by this relief surface build-up weld zone can be brought closer to or higher than the force of a new cutting blade. More specifically, the attracting force of the cutting blade by rotating for attracting the grinding objects by the blade tip works stronger on the relief surface build-up weld zone than on the scooping surface build-up weld zone, and by bonding the relief surface build-up weld zone forcibly in a wider range than the relief surface of the leading edge part, so that the grinding objects can be attracted forcibly by the blade tip of the rotating cutting blade.

In the regenerating method of a cutting blade of the invention, the relief surface build-up weld zone after regenerating processing is formed nearly on the entire relief surface of the blade tip.

As a result, the strength of the relief surface is enhanced, and if the grinding objects collide or rub the relief surface at the time of rotation of the cutting blade, wear or damage of the relief surface can be reduced. Hence, the service life of the cutting blade may be extended.

In the regenerating method of a cutting blade of the invention, the relief surface build-up weld zone after regenerating processing and the scooping surface build-up weld zone after regenerating processing are formed on a flat plane nearly same as the outer circumference of a main body of the cutting blade on which they are formed individually.

In this manner, the relief surface and the scooping surface of the blade tip after regenerating processing can be formed as a smooth flat plane. Hence, when shearing and grinding the grinding objects by rotating the cutting blade, the frictional resistance due to contact between the relief surface and the scooping surface of the blade tip, and collision resistance due to collision can be reduced, and the driving energy for rotating the cutting blade can be saved.

Even when the relief surface and the scooping surface of the blade tip after regenerating processing are formed as a smooth flat plane, the chamfered build-up weld zone left over in the chamfered portion of the leading edge part is firmly bonded with the weld layer formed on the relief surface and the scooping surface, thereby being bonded firmly with the leading edge part. This weld zone is formed when the relief surface and the scooping surface are melted at the time of build-up welding of the relief surface build-up weld zone and the scooping surface build-up weld zone.

In the regenerating method of a cutting blade of the invention, a grouping step is further provided for dividing the cutting blade differing in the degree of abrasion of the leading edge part and side edge parts, into a plurality of groups depending on the degree of abrasion, and the chamfering step is characterized by chamfering the leading edge part and the side edge parts of the cutting blade belonging to individual groups, to positions passing reference lines or reference planes as the reference of height of building up determined in each group.

In this regenerating method of a cutting blade, the cutting blade to be repaired differing in the degree of abrasion of the leading edge part and side edge parts is divided into a plurality of groups depending on the degree of abrasion (grouping step). Next, the chamfering step is carried out by chamfering the leading edge part and the side edge parts of the cutting blade belonging to individual groups, to positions passing reference lines or reference planes as the reference of height of building up determined in each group (chamfering step).

In the regenerating method of a cutting blade of the invention, the build-up welding step is capable of building up and welding to a specified build-up height determined in each group, in the leading edge part and the side edge parts.

In this way, since the build-up welding height of building up and welding on the leading edge part and the side edge parts of the cutting blade is determined in each group, the welding condition of the welding machine for building up and welding on the cutting blade in each group (for example, welding torch feed speed, build-up welding material supply speed, and others) may be determined, for example, uniformly. Hence, the build-up welding on the cutting blade may be automated, and the build-up welding quality may be enhanced and stabilized, and the welding cost can be lowered.

In the regenerating method of a cutting blade of the invention, an automatic welding machine is used in the build-up welding step for building up and welding on the chamfered leading edge part and side edge parts.

In this manner, when the build-up welding step is carried out by an automatic welding machine, the labor of the workers is saved, the efficiency of the regenerating job of the worn cutting blade is enhanced, and the quality of the regenerated cutting blade can be stabilized. Further, the running cost of the cutting blades of the shearing type grinding machine can be saved.

In the regenerating method of a cutting blade of the invention, the grouping step is intended to divide the cutting blade into the plurality of groups depending on the width dimension in the thickness direction of the blade tip.

In this manner, when the cutting blade is divided into a plurality of groups depending on the width dimension in the thickness direction of the blade tip of the cutting blade, it is possible to measure accurately the abrasion amount in the thickness direction of the side edge parts formed in the side outer edge parts including the blade tip of the cutting blade. Hence, in the side edge parts, it is possible to chamfer appropriately to the positions passing the reference lines or reference planes as the reference of build-up determined in each group. Thus, when chamfered appropriately, the build-up necessary for the chamfered portion can be welded accurately, and the width dimension in the thickness direction of the cutting blade in the side edge parts can be regenerated and processed nearly to the same dimension as in a new part.

As a result, for example, when two side edge parts mutually formed on two rotating cutting blades disposed oppositely to each other are mutually overlapped to shear and grind the grinding objects, the gap of the two side edge parts can be repaired nearly to a design value, and the grinding objects can be sheared and ground efficiently.

The regenerating method of a cutting blade of the invention further includes a preheating step of preheating the chamfered cutting blade to a specified temperature, and an after-heating step of after-heating the built up and welded cutting blade to a specified temperature, in which the build-up welding step is to build up and weld automatically by feeding continuously a hardening build-up welding material to the preheated and chamfered leading edge part and side edge parts, and the processing step is to regenerate and process the after-heated and built-up and welded cutting blade.

In this manner, when the cutting blade is preheated, the chamfered leading edge part and side edge parts can be built up and welded favorably, and hence the hardening build-up welding material can be supplied continuously, and build-up welding can be performed automatically by an automatic welding machine. Further, by after-heating the cutting blade, the residual stress of the cutting blade can be eliminated, and crack and deformation can be eliminated.

In the regenerating method of a cutting blade of the invention, the cutting blade is moved by a robot in the preheating step, the build-up welding step, and the after-heating step.

In this manner, even in the case of a cutting blade of a complicated shape in the leading edge part and the side edge parts, the cutting blade can be moved swiftly from the preheating step before the build-up welding to the after-heating step after the welding.

The regenerating equipment of a cutting blade of the invention is s regenerating equipment of a cutting blade to be repaired, having a fixed part, and a blade tip projecting outward from this fixed part, the blade tip having a leading edge part pointed toward a rotational direction, for regenerating and processing the cutting blade to be repaired having side edge parts at the side outer edge including the blade tip, including a chamfering machine for chamfering the leading edge part and the side edge parts of the cutting blade, a build-up welding machine for building up and welding the chamfered leading edge part and side edge parts, and a processing machine for regenerating and processing the built-up welded portions of the cutting blade into a specified shape of the leading edge part and the side edge parts, in which of the side build-up welding portions formed on the side edge parts, a lateral build-up weld zone extending on the lateral side of the cutting blade is specified in the dimension in a vertical direction on the outer circumference of the main body, from the outer circumference of the main body of the cutting blade, by 1 to 3 times of the dimension in thickness direction of the cutting blade, in an outer build-up weld zone extending on the outer circumference of the cutting blade.

According to the regenerating equipment of a cutting blade of the invention, the cutting blade having the leading edge part, and side edge parts can be regenerated and processed.

The chamfering machine chamfers the leading edge part and the side edge parts of the cutting blade. Next, the build-up welding machine builds up and welds the chamfered leading edge part and side edge parts, and the processing machine regenerates and processes the built-up welded portions of the cutting blade to a specified shape. In this manner, the cutting blade to be repaired is regenerated, and re-used.

Of the side build-up weld zones formed on the side edge parts, the lateral build-up weld zone extending on the side of the cutting blade is built up and welded by a build-up welding machine so that the dimension in a vertical direction on the outer circumference of the main body from the outer circumference of the main body of the cutting blade may be 1 to 3 times of the dimension in thickness direction of the cutting blade, in an outer build-up weld zone extending on the outer circumference of the cutting blade.

Accordingly, the bonding force on the side edge parts of the side build-up weld zone including the lateral build-up weld zone after the regenerating process, and the strength as the blade for exhibiting a shearing force by the lateral build-up weld zone after the regenerating process can be brought closer to or higher than the force of a new cutting blade.

In the regenerating equipment of a cutting blade of the invention, the processing machine is capable of regenerating and processing so that the lateral build-up weld zone after the regenerating process may project from the side of the cutting blade, and that the outer build-up weld zone after the regenerating process may be formed nearly on a same plane as the outer circumference of the main body of the cutting blade.

As a result, the action is same as explained in the regenerating method of a cutting blade.

In the regenerating equipment of a cutting blade of the invention, of the leading end build-up weld zone formed on the leading edge part, a relief surface build-up weld zone extending on a relief surface formed at the outside in a radius direction of the rotation of the blade tip is specified in the dimension in a vertical direction to its leading edge from the leading edge of the leading end build-up weld zone, to be larger than the dimension in a vertical direction to the leading edge from the leading edge of the leading end build-up weld one, in a scooping surface build-up weld zone extending on a scooping surface formed at the inner side of a radial direction of the rotation of the blade tip by the build-up welding machine.

As a result, the action is same as explained in the regenerating method of a cutting blade.

In the regenerating equipment of a cutting blade of the invention, the relief surface build-up weld zone after regenerating processing is formed nearly on the entire relief surface of the blade tip by the processing machine.

As a result, the action is same as explained in the regenerating method of a cutting blade.

In the regenerating equipment of a cutting blade of the invention, the relief surface build-up weld zone after regenerating processing and the scooping surface build-up weld zone after regenerating processing are formed on a flat plane nearly same as the outer circumference of a main body of the cutting blade on which they are formed individually by the processing machine.

As a result, the action is same as explained in the regenerating method of a cutting blade.

In the regenerating equipment of a cutting blade of the invention, the regenerating equipment of a cutting blade divides the cutting blade to be repaired into a plurality of groups depending on the degree of abrasion, and regenerates in each group, and the chamfering machine chamfers the leading edge part and the side edge parts of the cutting blade belonging to individual groups, to positions passing reference lines or reference planes as the reference of height of building up determined in each group.

According to this regenerating equipment of a cutting blade, the cutting blade to be repaired having the leading edge part and side edge parts can be regenerated and processed in each group by dividing into a plurality of groups depending on the degree of abrasion.

The chamfering machine chamfers the leading edge part and side edge parts of the cutting blade belonging to each group, so as to pass the reference lines or reference planes as the reference of building height determined in each group.

In the regenerating equipment of a cutting blade of the invention, the build-up welding step is characterized by welding a build-up by a build-up height specified in each group, on the leading edge part and side edge parts.

As a result, the action is same as explained in the regenerating method of a cutting blade.

In the regenerating equipment of a cutting blade of the invention, the build-up welding machine is an automatic welding machine.

As a result, the action is same as explained in the regenerating method of a cutting blade.

The cutting blade for a shearing type grinding machine of the invention is regenerated by the reprocessing methods of a cutting blade of the invention.

According to the cutting blade for a shearing type grinding machine of the invention, the bonding force on the side edge parts of the side build-up weld zone including the lateral build-up weld zone, and the strength as the blade for exhibiting a shearing force by the lateral build-up weld zone can be brought closer to or higher than the force of a new cutting blade. In other aspects, the action is same as explained in the regenerating method of a cutting blade.

Effects of the Invention

According to the regenerating method of a cutting blade of the invention, its regenerating method, and the cutting blade for a shearing type grinding machine, the bonding force on the side edge parts of the side build-up weld zone including the lateral build-up weld zone, and the strength as the blade for exhibiting a shearing force by the lateral build-up weld zone can be brought closer to or higher than the force of a new cutting blade. Therefore, the quality of the regenerated cutting blade may be closer to or higher than that of a new cutting blade. Moreover, by using a minimum welding material, the cutting blade of stable quality may be regenerated efficiently.

BRIEF DESCRIPTION OF THE DRAWINGS

FIG. 1 is perspective view of a cutting blade of a new product to explain a regenerating method of a cutting blade in an embodiment of the invention.

FIG. 7 is a diagram showing a regenerating procedure by using the regenerating method of a cutting blade of the embodiment, (a) being a sectional view showing a leading edge part of a new cutting blade, and (b) being a leading edge part chamfered after being worn.

FIG. 9 is a diagram showing a relation between groups of cutting blades to be regenerated by the regenerating method of the embodiment and the width dimension of the blade tips.

FIG. 19 is a diagram showing a state of build-up welding on leading edge part of a cutting blade by an automatic welding machine of the regenerating equipment of the embodiment, (a) being a perspective view, and (b) being a side view.

FIG. 20 (a) to (c) are perspective views showing a procedure of build-up welding of the leading edge part shown in FIG. 19.

FIG. 26 (a) is a perspective view showing a state of inspection after build-up welding, and (b) is a perspective view showing a state of manual correction.

FIG. 28 (a) is a side view showing a rotary blade on which a cutting blade is disposed after the after-heating treatment shown in FIG. 27, and (b) is a side view showing other one-piece type cutting blade.

EMBODIMENTS OF THE INVENTION

Figure 29:
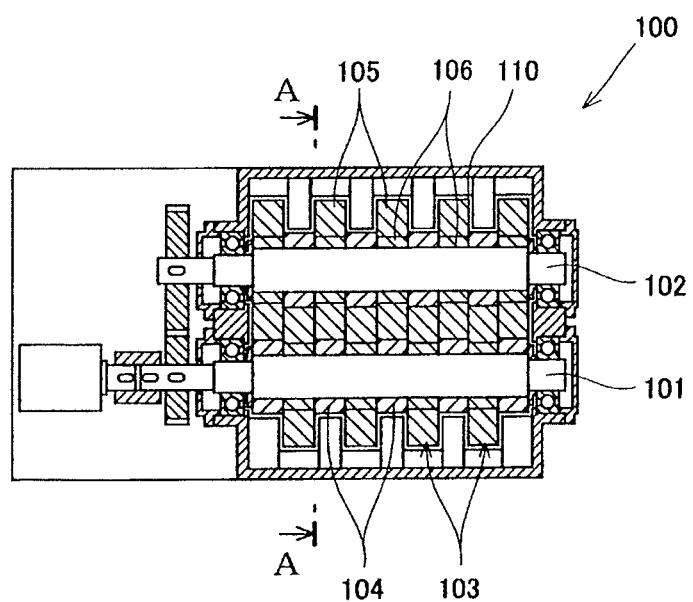
FIG. 29 is a side sectional view showing a conventional shearing type grinding machine.
Figure 30:
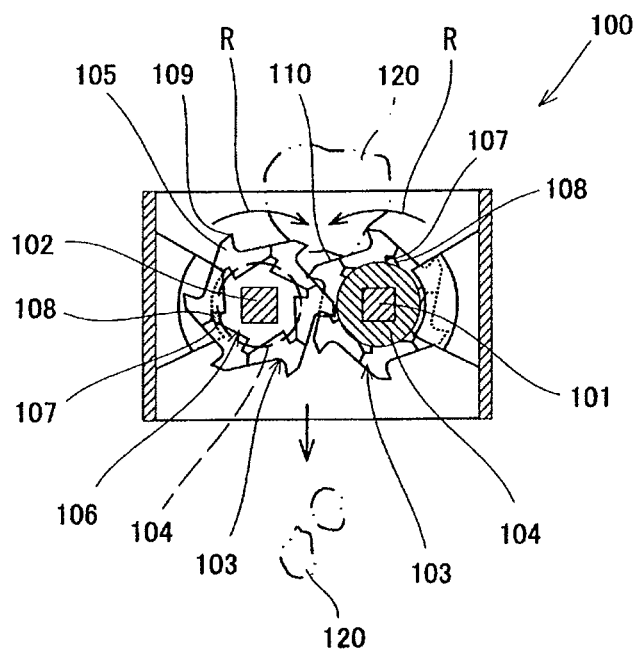
FIG. 30 is a sectional view of A-A of the shearing type grinding machine shown in FIG. 29.

Embodiments of a regenerating method of a cutting blade, its regenerating equipment, and a cutting blade for a shearing type grinding machine (hereinafter sometimes called merely as a cutting blade) of the invention are described below while referring to FIG. 1 to FIG. 30. A new cutting blade 3 shown in FIG. 1 is installed in a shearing type grinding machine 100 as shown in FIG. 29 and FIG. 30, and when it is used for a specific time, a leading edge part 31 and side edge parts 32 are worn, and the grinding performance is lowered, and the grinding effect drops.

Figure 2:
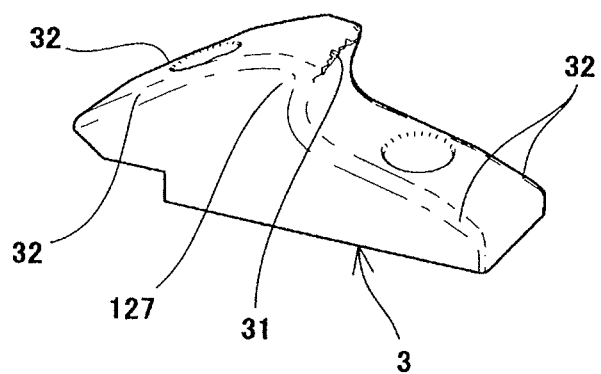
FIG. 2 shows a cutting blade regenerated by the regenerating method of the embodiment, (a) being a perspective view of a worn cutting blade, and (b) being a perspective view showing a state of inspection for dividing the worn cutting blade into groups.
Figure 2:
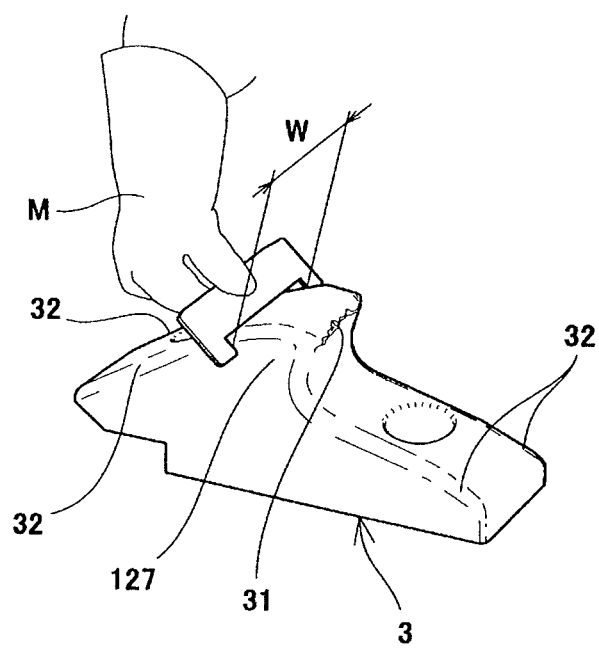

FIG. 2 (a) is a perspective view showing this worn cutting blade 3. As shown in this perspective view, the leading edge part 31 and side edge parts 32 of the cutting blade 3 are worn and become round, and the edge parts 32 may be cut.

In this manner, in particular, when the side edge parts 32 are worn, and the width W dimension of the blade tip 127 shown in FIG. 2 (b) becomes smaller, a gap large than specified may be formed on mutually opposite sides of the worn cutting blade 3 mounted on the grinding machine 100, and the grinding efficiency is lowered.

By using the regenerating method of a cutting blade of the invention and its regenerating equipment 1, the leading edge part 31 and side edge parts 32 of the worn cutting blade 3 are repaired (regenerated), and the worn cutting blade 3 can be regenerated and re-used.

The cutting blade 3 to be regenerated (a new cutting blade before being worn) is as shown in FIG. 1, same as shown in FIG. 29 and FIG. 30, and includes the leading edge part 31 pointed to the rotation direction R side of a blade tip 127 projecting outward, and side edge parts 32 formed along the side outer edges. An engaging step 107 is provided in the mounting surface (lower side of fixing part 125) of the cutting blade 3, and this engaging step 107 is engaged with an engaging protrusion 108 provided on a blade rest 106 shown in FIG. 30, thereby receiving a grinding reaction.

These edge parts 31, 32 are worn by shearing and grinding, but since the cutting blade 3 having these edge parts 31, 32 is of split type, and if the edge parts 31, 32 are worn, only the cutting blade 3 can be replaced without replacing the blade rest 106.

In FIG. 1, reference numeral 126 is a bolt insert hole. The bolt insert hole 126 is for inserting a fixing bolt for mounting the cutting blade 3 detachably on the blade rest 106.

Figure 3:
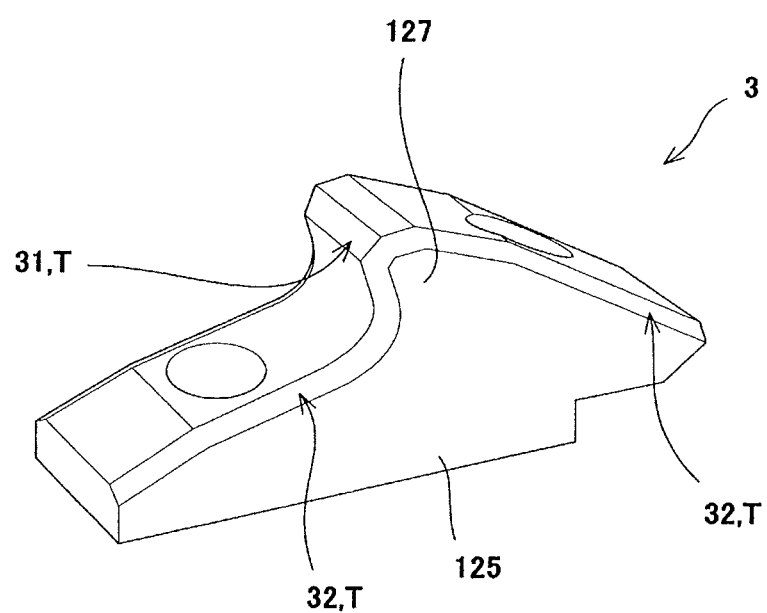
FIG. 3 is a perspective view showing a cutting blade chamfered in the leading edge part and side edge parts of the cutting blade to be regenerated shown in FIG. 2(*a*).
Figure 4:
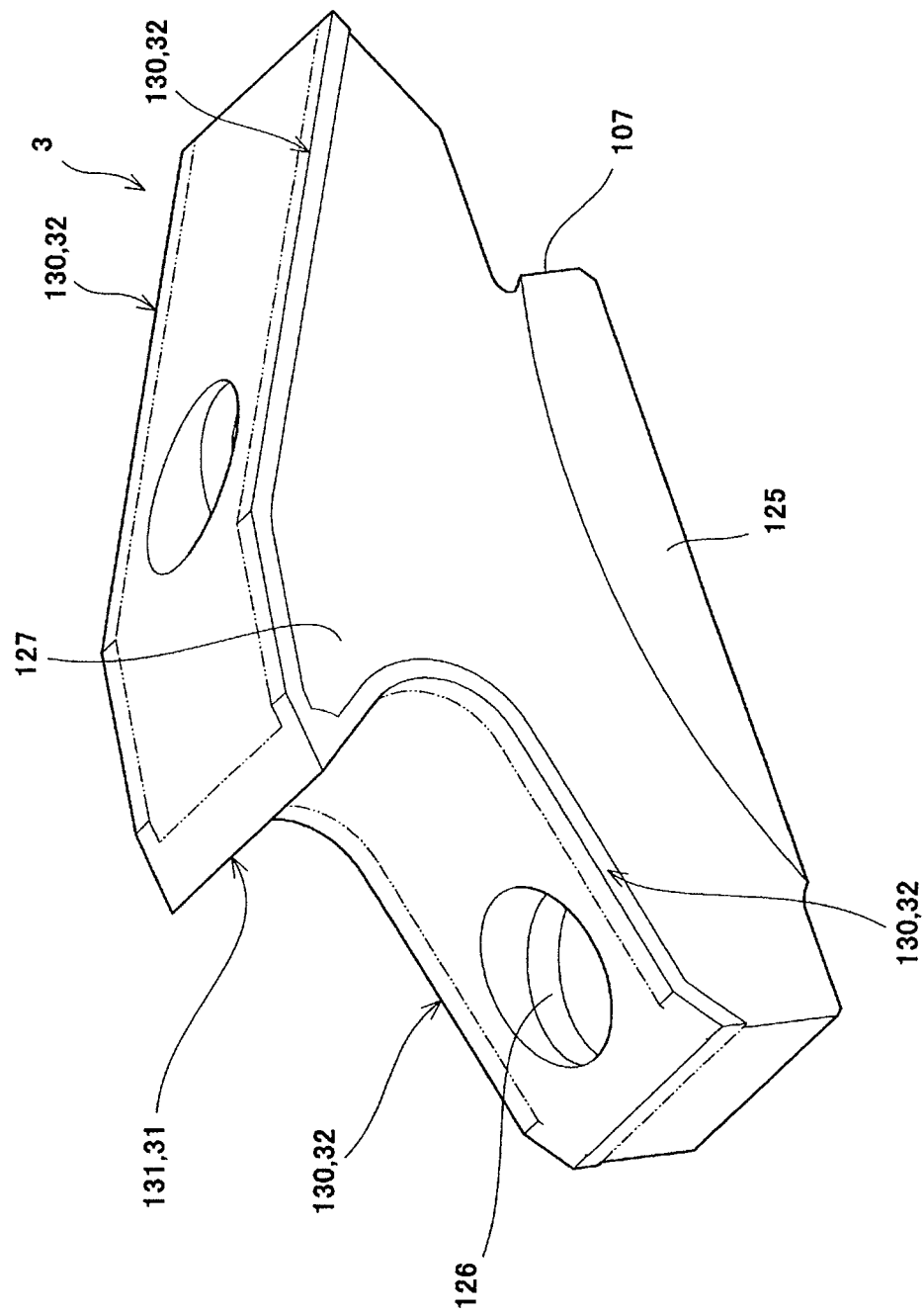
FIG. 4 is a perspective view showing a cutting blade regenerated by a regenerating method of a cutting blade of the embodiment.

The regenerating method of a cutting blade of the embodiment is described. This regenerating method of a cutting blade includes a chamfering step of chamfering the leading edge part 31 and the side edge parts 32 of a worn cutting blade shown in FIG. 3, as shown in FIG. 3, a build-up welding step of building up and welding on the chamfered leading edge part 31 and side edge parts 32, and a processing step of regenerating the build-up welded parts of the cutting edge 3 as shown in FIG. 4 into a specified shape of the leading edge part 31 (131) and side edge parts 32 (130). In this manner, the cutting edge 3 to be repaired is regenerated to be re-used.

Figure 5:
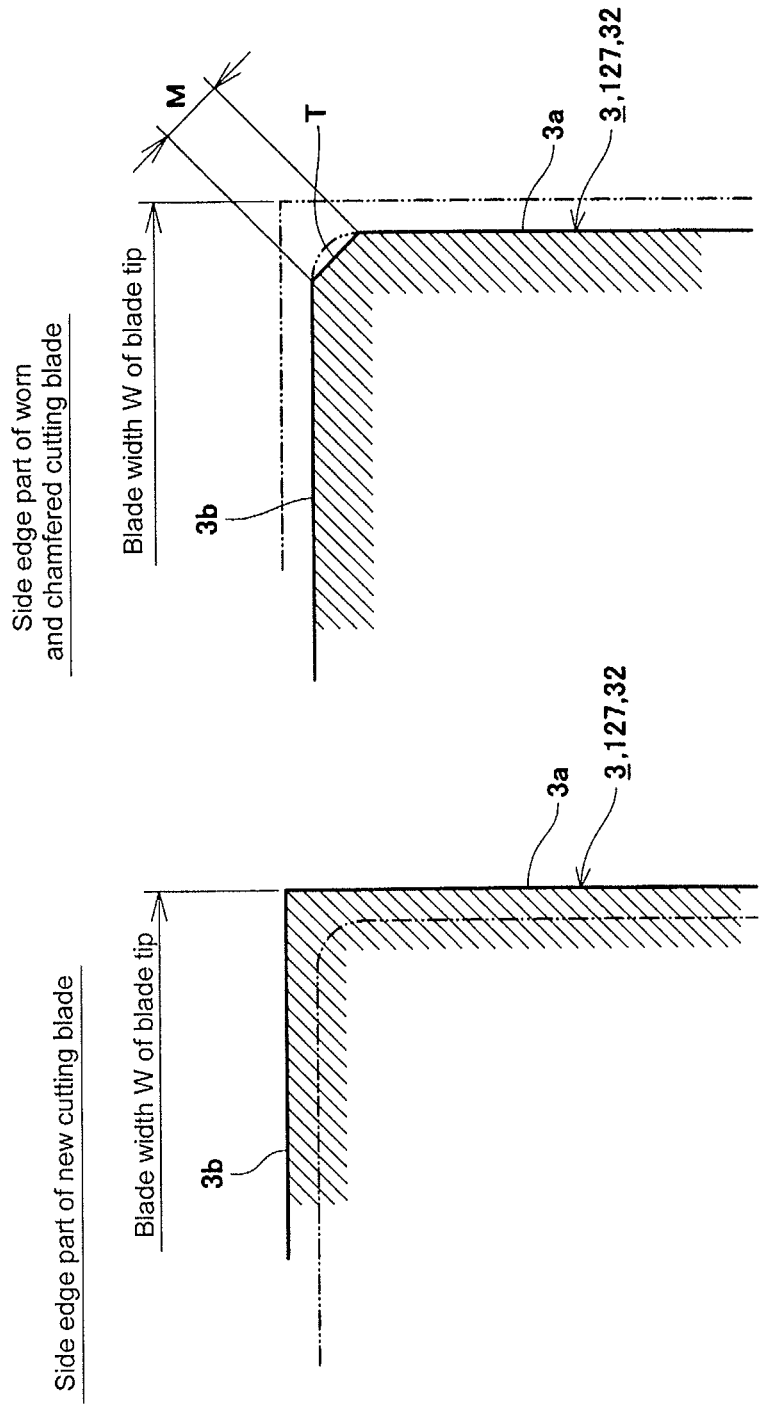
FIG. 5 is a diagram showing a regenerating procedure by using the regenerating method of a cutting blade of the embodiment, (a) being a sectional view showing a side edge part of a new cutting blade, and (b) being a side edge part chamfered after being worn.
Figure 6A:
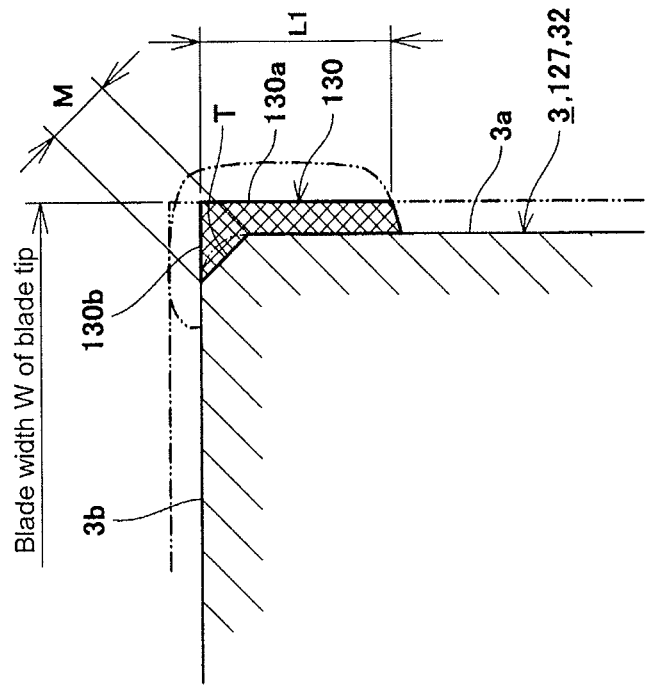
FIG. 6 is a diagram showing a regenerating procedure by using the regenerating method of a cutting blade of the embodiment, (a) being a sectional view showing a built up and welded side edge part, and (b) being a regenerated side edge part.
Figure 6B:
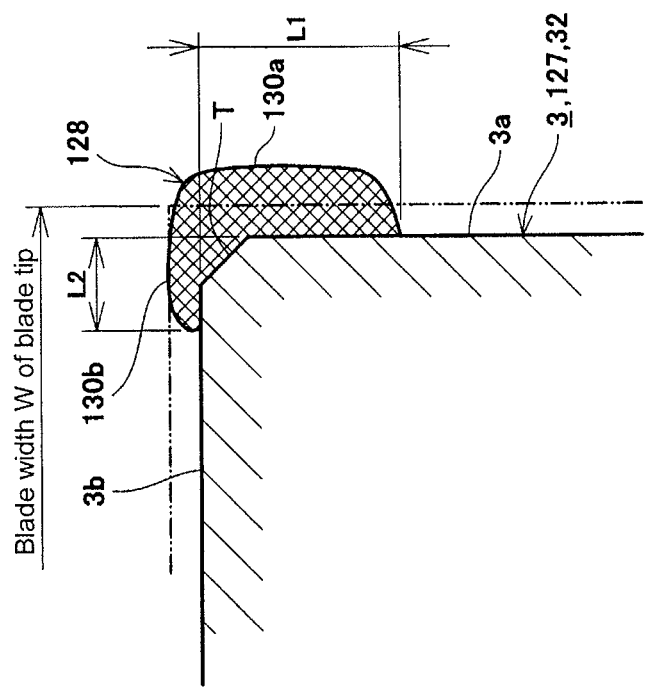

First, in this regenerating method of a cutting blade of the embodiment, the shape (before the regenerating process) of the side build-up weld zone 128 formed in the build-up welding step on the side edge parts 32 (see FIG. 6 (*a*)), and the shape of the side build-up weld zone 130 after the regenerating process in the regenerating step (see FIG. 6 (*b*)) are explained by referring to FIG. 1 to FIG. 6.

The shape of the side build-up weld zone 128 before the regenerating process shown in FIG. 6 (*a*) is increased in the bonding force on the side edge parts 32 of the side build-up weld zone 130 including the lateral build-up weld zone 130*a* of the cutting blade 3 regenerated and processed as shown in FIG. 6 (*b*), and the strength as the blade for exhibiting a shearing force by the lateral build-up weld zone 130*a*, closer to or higher than the force of a new cutting blade 3.

FIG. 5 (*a*) is a sectional view of the side edge part 32 at the blade tip 127 of, for example, a new cutting blade 3. At this time, the blade width of the blade tip 127 is W.

FIG. 5 (*b*) is a sectional view showing a state of chamfering on the side edge part 32 of a worn cutting blade 3 (chamfering step). The width of the chamfered part T is M.

FIG. 6 (*a*) is a side view showing a state of build-up welding on the chamfered side edge part 32 (build-up welding step).

As shown in FIG. 6 (*a*), of the side build-up weld zone 128 formed on the side edge part 32, in the lateral build-up weld zone 130*a* extending on the side 3*a* of the cutting blade 3, the dimension L1 in the vertical direction to the outer circumference 3*b* of the main body from the outer circumference 3*b* of the main body of the cutting blade 3 is about 1.5 times (preferably 1 to 3 times) of the dimension L2 in the thickness direction of the cutting blade 3 in the outer build-up weld zone 130*b* extending on the outer circumference 3*b* of the cutting blade 3.

FIG. 6 (*b*) is a sectional view showing a state of regenerating processing of the side build-up weld zone 128 built up and welded on the cutting blade 3 into a specified shape of the side edge part 32 (processing step).

As shown in FIG. 6 (*b*), the lateral build-up weld zone 130*a* after the regenerating process projects from the side 3*a* of the cutting blade 3, and the blade width of the lateral build-up weld zone 130*a* is formed to be same as the blade width W of the blade tip 127 of a new product. The outer build-up weld zone 130*b* after the regenerating process is formed nearly on a same plane as the outer circumference 3*b* of the main body of the cutting blade 3.

The action of the regenerating method of the side edge parts 32 having such configuration is explained. As shown in FIG. 6 (*a*), the dimension L1 of the lateral build-up weld zone 130*a* is about 1.5 times (preferably 1 to 3 times) of the dimension L2 of the outer build-up weld zone 130*b*, and therefore the bonding force on the side edge parts 32 of the side build-up weld zone 130 including the lateral build-up weld zone 130*a* of the cutting blade 3 after the regenerating process, and the strength as the blade for exhibiting a shearing force by the lateral build-up weld zone 130*a* after the regenerating process may be brought closer to or higher than the force of a new cutting blade 3.

Therefore the quality of the regenerated and processed cutting blade 3 may be brought closer to or higher than that of a new cutting blade 3. Moreover, by using a minimum welding material, the cutting blade 3 of a stable quality can be regenerated efficiently.

In this way, as shown in FIG. 6 (*b*), when the lateral build-up weld zone 130*a* after the regenerating process is formed to project from the side 3*a* of the cutting blade 3 (not forming on the entire side 3*a*), only the portion responsible for function as a blade for shearing and grinding the grinding objects out of the side edge parts 32 can be regenerated by the lateral build-up weld zone 130*a*. As a result, the material cost for the lateral build-up weld zone 130*a* can be saved, and time and labor of the regenerating process can be saved.

That is, as shown in FIG. 6 (*a*), the meaning of setting the dimension L1 of the lateral build-up weld zone 130*a* at about 1.5 times (preferably 1 to 3 times) of the dimension L2 of the outer build-up weld zone 130*b* specified in FIG. 6 (*b*), that is, the lateral build-up weld zone 130*a* after the regenerating process is for the purpose of achieving the function as a blade for shearing and grinding the grinding objects, and this function is achieved sufficiently, while the material cost of the lateral build-up weld zone 130*a* is saved, and the time and labor of the regenerating process can be saved substantially.

Moreover, although the outer build-up weld zone 130*b* is removed by the regenerating process, it is formed along the range (range of dimension L2) at the outer side of the chamfered part T, because it is intended to weld securely on the chamfered part T of the chamfered build-up welded part formed on the chamfered part T. By setting the dimension L1 of the lateral build-up weld zone 130*a* at about 1.5 times (preferably 1 to 3 times) of the dimension L2 of the outer build-up weld zone 130*b*, the lateral build-up weld zone 130*a* can achieve the function.

As shown in FIG. 6 (*b*), by forming the outer build-up weld zone 130*b* after the regenerating process nearly on a same plane as the outer circumference 3*b* of the main body of the cutting blade 3, the outer circumference 3*b* of the cutting blade 3 can be formed as a smooth flat plane. As a result, when shearing and grinding the grinding objects by rotating the cutting blade 3, the frictional resistance due to contact between the outer circumference 3*b* of the cutting blade 3 and the grinding objects, and collision resistance due to collision can be reduced, and the driving energy for rotating the cutting blade 3 can be saved.

However, in the embodiment, as shown in FIG. 6 (*b*), the outer build-up weld zone 130*b* after the regenerating process is formed nearly on a same plane as the outer circumference 3*b* of the main body of the cutting blade 3, but instead the outer build-up weld zone 130*b* after the regenerating process may be formed on the outer circumference 3*b* of a new cutting blade 3.

Figure 8:
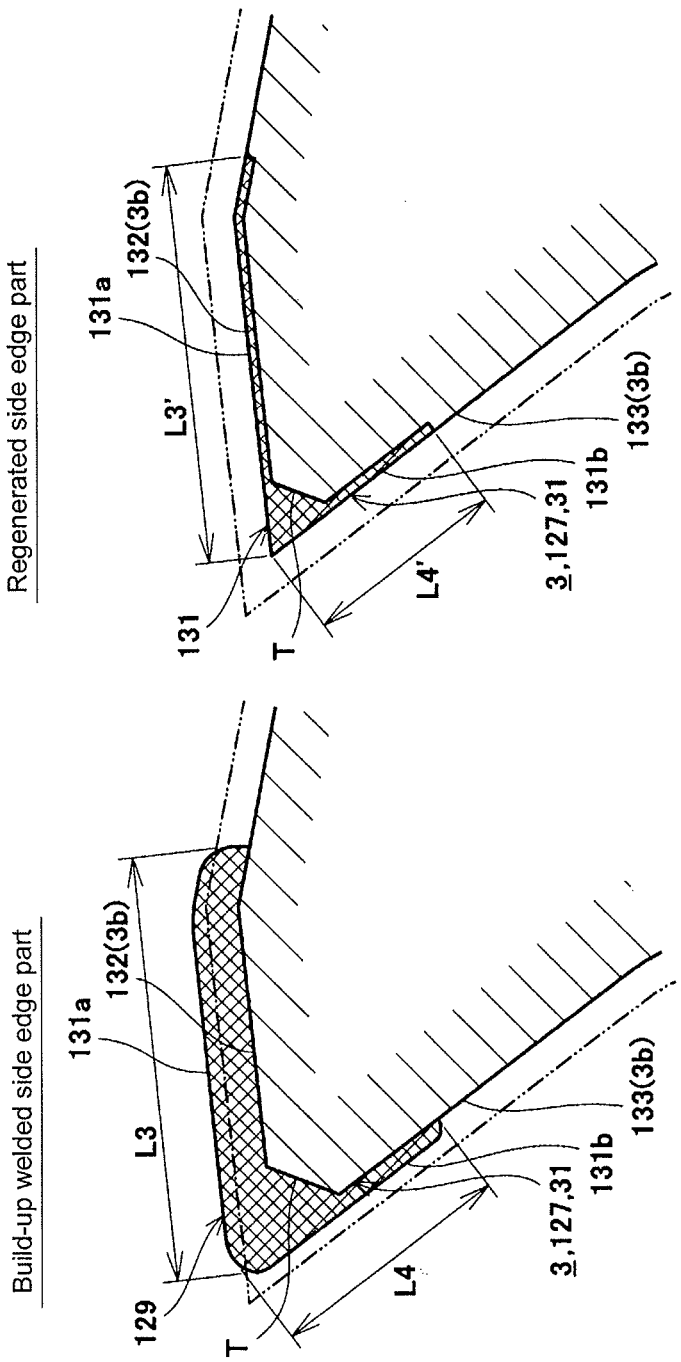
FIG. 8 is a diagram showing a regenerating procedure by using the regenerating method of a cutting blade of the embodiment, (a) being a sectional view showing a built up and welded leading edge part, and (b) being a regenerated leading edge part.

Next, of the regenerating method of a cutting blade, the shape (before the regenerating process) of the leading end build-up weld zone 129 formed in the build-up welding step on the leading edge part 31 (see FIG. 8 (*a*)), and the shape of the leading end build-up weld zone 131 after the regenerating process in the regenerating step (see FIG. 8 (*b*)) are explained by referring to FIG. 7 and FIG. 8.

This regenerating method of a cutting blade also includes a chamfering step and a build-up welding step as shown in FIG. 3, and a processing step for regenerating and processing as shown in FIG. 4. In this way, the cutting blade 3 to be repaired can be regenerated and re-used.

FIG. 7 (a) is a sectional view of a leading edge part 31 in a blade tip 127 of a new cutting blade 3

FIG. 7 (b) is a sectional view showing a state of chamfering on the leading edge part 31 of a worn cutting blade 3 (chamfering step). The width of the chamfering part T is M.

FIG. 8 (a) is a sectional view showing a state of build-up welding on the chamfered leading edge part 31 (chamfering step).

As shown in FIG. 8 (a), a relief surface build-up weld zone 131a extending on a relief surface formed at the outside in a radius direction of the rotation of the blade tip 127 out of a leading end build-up weld zone 129 formed on the leading edge part 31 before regenerating process is formed on an entire relief surface 132, a dimension L3 in the vertical direction to the leading edge from the leading edge of the leading end build-up weld zone 129 is larger than a dimension L4 in the vertical direction to the leading edge from the leading edge of the leading end build-up weld zone 129, on a scooping surface build-up weld zone 131b extending on a scooping surface 133 formed at the inner side in a radius direction of rotation R of the blade tip 127 (for example, 1.5 times or more).

FIG. 8 (b) is a sectional view showing a state of regenerating process of the built up and welded leading end build-up weld zone 129 of the cutting blade 3 so as to be a specified shape of the leading edge 31 (processing step).

As shown in FIG. 8 (b), the relief surface build-up weld zone 131a after the regenerating process is formed on entire relief surface 132 of the blade tip 127. The relief surface build-up weld zone 131a after the regenerating process and the scooping surface build-up weld zone 131b after the regenerating process are formed on a nearly same plane as the outer circumference 3b of the main body of the cutting blade 3 on which they are formed.

The action of the regenerating method of the leading edge part 31 having such configuration is explained. As shown in FIG. 8 (a), the dimension L3 of the relief surface build-up weld zone 131a before the regenerating process is set larger than the dimension L4 of the scooping surface build-up weld zone 131b before regenerating process (for example, 1.5 times or more), and therefore the bonding force on the leading edge part 31 of the leading end build-up weld zone 131 including the relief surface build-up weld zone 131a after the regenerating process, and the attracting strength for attracting the grinding objects by the relief surface build-up weld zone 131a can be brought closer to or higher than the force of a new cutting blade 3.

In other words, the blade tip 127 functions to attract the grinding objects when the cutting blade 3 rotates, and the attracting force of the blade tip 127 to attract the grinding objects functions larger on the relief surface build-up weld zone 131a after the regenerating process than on the scooping surface build-up weld zone 131b after the regenerating process shown in FIG. 8 (b), and by bonding the relief surface build-up weld zone 131a powerfully to the relief surface 132 of the leading edge part 31 in a wider range (the entire relief surface 132), the grinding objects can be attracted powerfully by the blade tip 127 of the rotating cutting blade 3.

Further, as shown in FIG. 8 (b), when the relief surface build-up weld zone 131a after the regenerating process is formed nearly on the entire relief surface 132 of the blade tip 127, the strength of the relief surface 132 may be enhanced, and if the relief surface 132 is damaged or collided by the grinding objects when the cutting blade 3 rotates, wear or damage of the relief surface 132 may be reduced, and the life of the cutting blade 3 may be extended.

When the relief surface build-up weld zone 131a after the regenerating process and the scooping surface build-up weld zone 131b after the regenerating process are formed nearly on same plane as the outer circumference 3b of the main body 3 of the cutting blade 3 on which they are formed, the relief surface 132 and the scooping surface 133 of the blade tip 127 after the regenerating process may be formed as a smooth flat plane. As a result, when shearing and grinding the grinding objects by rotating the cutting blade 3, the frictional resistance due to contact between the relief surface 132 and the scooping surface 133 of the blade tip 127, and collision resistance due to collision can be reduced, and the driving energy for rotating the cutting blade 3 can be saved.

Even when the relief surface 132 and the scooping surface 133 of the blade tip 127 after the regenerating process are formed as a smooth flat plane, the chamfered build-up weld zone left over on the chamfered part T of the leading edge 31 is firmly bonded with the welding layer formed on the relief surface 132 and the scooping surface 133, and is firmly bonded to the leading edge part 31. This welding layer is formed by fusion of the relief surface 132 and the scooping surface 133 at the time of build-up welding of the relief surface build-up weld zone 131a after the regenerating process and the scooping surface build-up weld zone 131b.

Incidentally, the dimension L3' of the relief surface build-up weld zone 131a after the regenerating process and the dimension L4' of the scooping surface build-up weld zone 131b after regenerating process shown in FIG. 8 (b) are smaller than the dimension L3 of the relief surface build-up weld zone 131a before the regenerating process is set larger than the dimension L4 of the scooping surface build-up weld zone 131b before regenerating process shown in FIG. 8 (a).

In this embodiment, as shown in FIG. 8 (b), the relief surface build-up weld zone 131a after the regenerating process and the scooping surface build-up weld zone 131b after the regenerating process are formed nearly on a same plane as the outer circumference 3b of the main body of the cutting blade 3 on which they are formed, but instead, both of or one of the relief surface build-up weld zone 131a after the regenerating process and the scooping surface build-up weld zone 131b after the regenerating process may be formed on the relief surface 132 or the scooping surface 133 of a blade tip 127 of a new product.

Further, as shown in FIG. 8 (b), the relief surface build-up weld zone 131a after the regenerating process is formed on the entire relief surface 132, but instead it may be formed in a part of the relief surface 132.

Next, the regenerating method of a cutting blade intended to divide the worn cutting blade 3 into groups is explained. This regenerating method of a cutting blade, as shown in FIG. 11, includes a grouping step (step S101) of dividing the worn cutting blade 3 into groups, a chamfering step (step S102) of chamfering the worn cutting blade 3, a preheating step (step S103) of preheating the chamfered cutting blade 3, a start-point build-up welding step (step S104) of building up and welding on a start point of welding of the chamfered portion, a build-up welding step (step S105) of building up and welding on the chamfered portion, an after-heating step (step S106) of after-heating the build-up welded cutting blade 3, and a processing step (step S107) of regenerating (finishing) the after-heated cutting blade 3.

Figure 11:
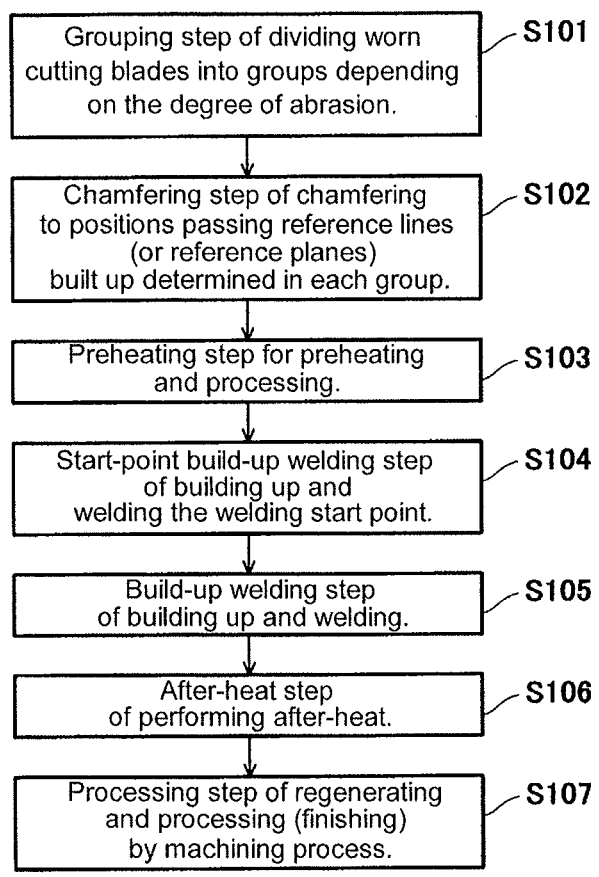
FIG. 11 is a flowchart showing each process of the regenerating method of the embodiment.

The grouping step (step S101) shown in FIG. 11 is a step of dividing the cutting blade 3 differing in the degree of abrasion of the leading edge part 31 and side edge parts 32 into a plurality of groups depending on the degree of abrasion. These plural groups are five groups, A, B, C, D, E, in this embodiment. However, the number of groups is not particularly specified.

In a method of dividing the worn cutting blade 3 into five groups A to E, for example, as shown in FIG. 2, the worker measures the width dimension W in the thickness direction of the blade tip 127 of the worn cutting blade 3 by using a specified inspecting tool 84, and divides the cutting blade 3 into five groups A to E on the basis of the width dimension W.

As shown in FIG. 9, for example, suppose the width dimension W of the blade tip 127 of a new cutting blade 3 to be W1. A group of a smallest amount of abrasion is supposed to be A, and groups are divided into B to E along with the increase of the degree of abrasion. However, group E is a group that cannot be repaired by build-up welding because the degree of abrasion is too large.

The width dimension W of each group is divided as follows: less than W1 to W2 or more in group A (for example, 75 to 72.5 mm), less than W2 to W3 or more in group B (for example, 72.5 to 70 mm), less than W3 to W4 or more in group C (for example, 70 to 67.5 mm), less than W4 to W5 or more in group D (for example, 67.5 to 65 mm), and less than W5 in group E (for example, 65 mm or less).

Figure 10:
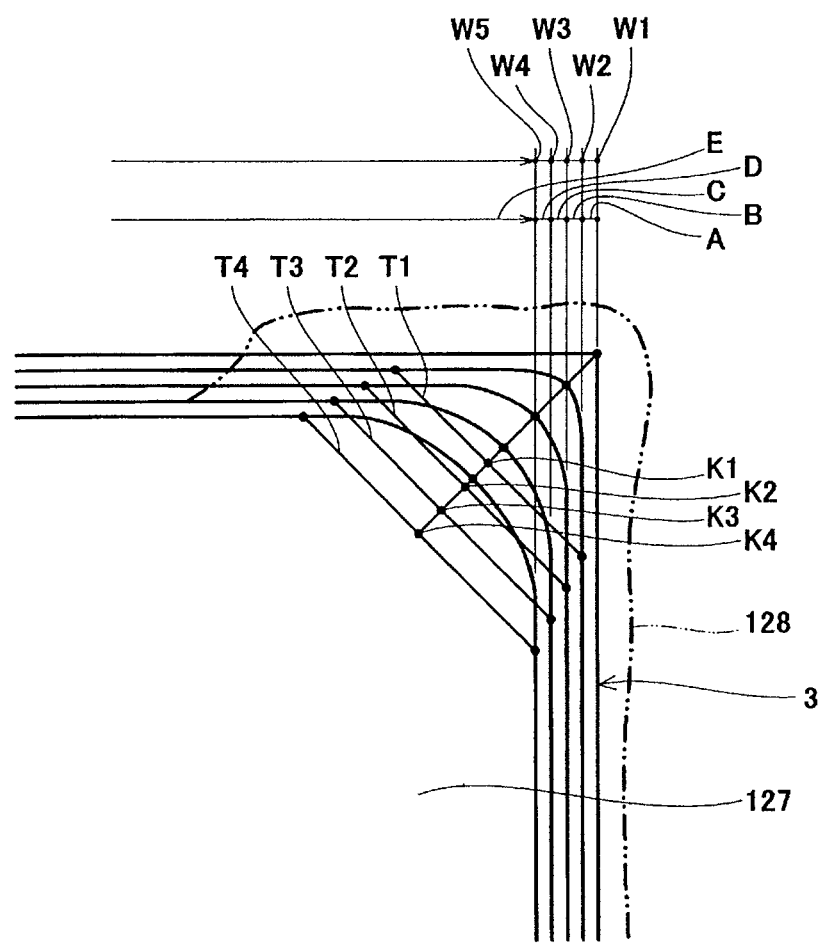
FIG. 10 is a diagram showing a relation between groups of cutting blades to be regenerated by the regenerating method of the embodiment and the width dimension and reference lines of blade tips.

FIG. 10 is a partially enlarged sectional view showing the blade tip 127 of the cutting blade 3. As shown in this sectional view, the sectional shape of the blade tip 127 of a new cutting blade 3 is formed nearly at right angle, and its width dimension W is expressed as W1. As the abrasion of the side edge parts 32 of the blade tip 127 increases, the radius of the round part of the side edge parts 32 becomes large, and the width dimension W gradually becomes smaller from W1 to W2, - - -, W5. Depending on the width dimensions W1, W2, - - -, W5, the groups are divided A to E.

The chamfering step (step S102) shown in FIG. 11 is a step of chamfering the leading edge part 31 and side edge parts 32 of the cutting blade 3 belonging to groups A to D to positions passing reference lines K (K1, K2, K3, K4) (or reference planes) as the reference for build-up height specified for each of groups A to D (FIG. 9).

Reference lines K1, K2, - - -, K4 as the reference for build-up height determined for these groups A, B, - - -, D are determined, as shown in FIG. 10, when the worn cutting blade 3 is judged to belong to group A, a chamfering part T1 is formed by chamfering by about 45°, for example, at a position passing reference line K1. Similarly, when the worn cutting blade 3 is judged to belong to group B, C, or D, a chamfering part T2, T3, or T4 is formed by chamfering by about 45°, for example, at a position passing reference line K2, K3, or K4.

Next is explained a setting method of reference lines K1 to K4. As shown in FIG. 10, the cutting blade 3 belonging to group A is chamfered at a position passing reference line K1, and a chamfering part T1 is formed. This chamfering part T1 is set to form side edge parts 32 (and leading edge part 31) of a new cutting blade 3 as the chamfering part T1 is built up and welded. Herein, the size of the chamfering part T1 has an area enough necessary for building up and welding, and is set so as not to be too large than required. Similarly, reference lines K2 to K4 are determined.

The chamfering machine is programmed to perform this chamfering process automatically by machining.

The preheating step (step S103) shown in FIG. 11 is a step of preheating the chamfered cutting blade 3, as shown in FIG. 10, to a specified temperature by a preheating machine 60. This preheating machine 60 is provided in the regenerating equipment 1 shown in FIG. 12 later.

Thus, by preheating the cutting blade 3, a favorable build-up welding can be applied to the chamfered leading edge part 31 and side edge parts 32. As a result, a hardening build-up welding material is supplied continuously, and automatic build-up welding operation can be carried out favorably by an automatic welding machine 50.

The start-point build-up welding step (step S104) shown in FIG. 11 is a step of building up and welding on a welding start point of the chamfering part T shown in FIG. 10. That is, a hardening build-up welding material is supplied to the welding start point of leading edge part 31 and side edge parts 32 of the cutting blade 3 chamfered and preheated by the preheating machine 60, and arc-spot automatic build-up welding is carried out by the automatic welding machine 50.

This start-point build-up welding step is capable of preventing weld drooping at the welding start point when building up and welding between start points of build-up welding, and allowing continuous build-up wending between start points neatly and continuously.

The build-up welding step (step S105) shown in FIG. 11 is a step of supplying a hardening build-up welding material continuously on the leading edge part 31 and side edge parts 32 of the cutting blade 3 preheated by the preheating machine 60 and chamfered, and forming a build-up welding automatically by the automatic welding machine 50.

In this build-up welding step, the build-up welding of specified build-up height determined in each one of groups A to D is applied on the leading edge part 31 and side edge parts 32.

In this way, since the build-up height of the build-up welding on the leading edge part 31 and side edge parts 32 of the cutting blade 3 is determined individually in groups A to D, the welding condition of the automatic welding machine 50 (for example, feed speed of welding torch 55, supply speed of hardening build-up welding material) can be, for example, unified when welding automatically on the cutting blades 3 belonging to groups A to D. As a result, the build-up welding on the cutting blades 3 can be automated, and the quality of build-up welding can be enhanced and stabilized, and the welding cost is lowered.

In FIG. 10, double-dot chain line 128 shows a state of build-up welding on the side edge 32 of the cutting blade 3 belonging to group C.

The build-up welding on the leading edge part 31 and the side edge parts 32 is performed as explained above, as shown in FIG. 6 (*a*) and FIG. 8(*a*).

Figure 12:
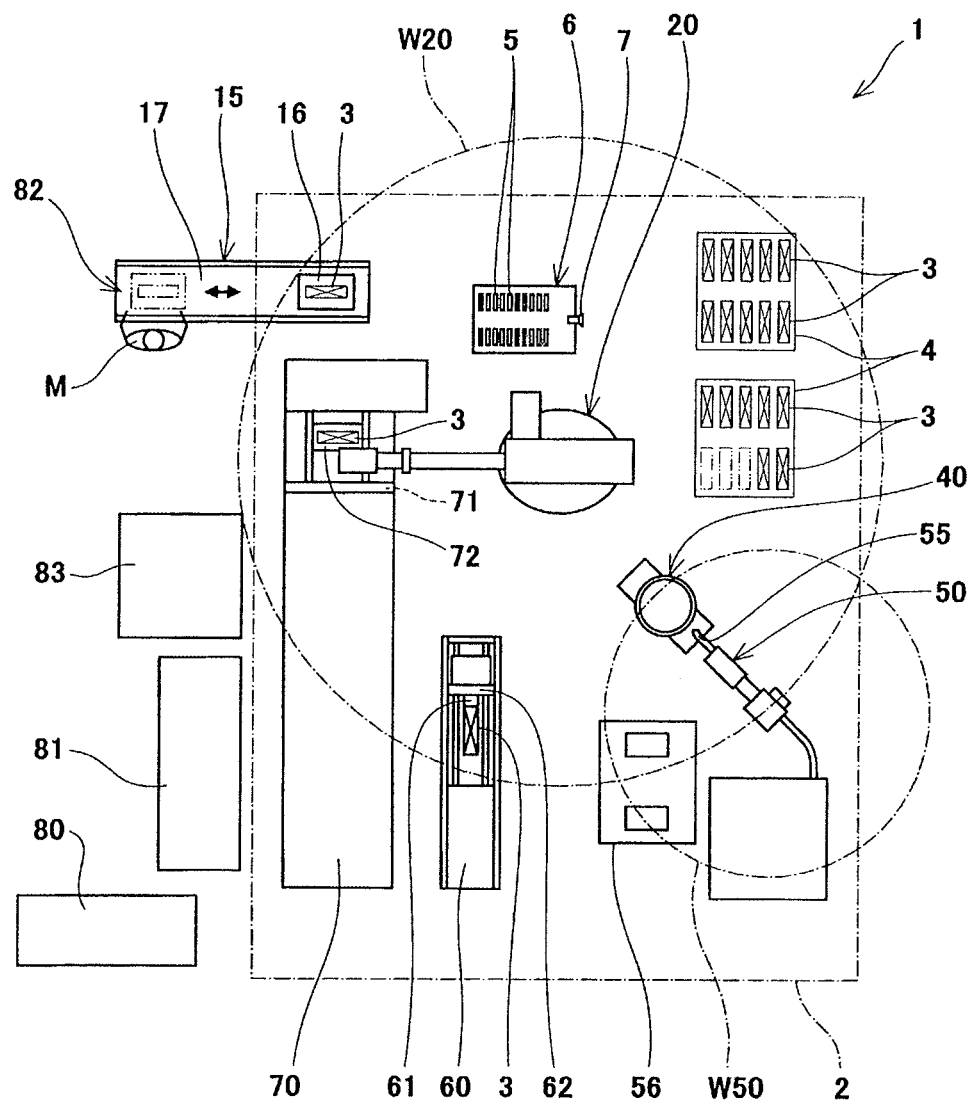
FIG. 12 is a plan view showing a regenerating equipment of a cutting blade in an embodiment of the invention.

The after-heating step (step S106) shown in FIG. 11 is a step of after-heating the cutting blade 3 built up and welded on the chamfered part T at a specified temperature by an after-heating machine 70 shown in FIG. 12.

In this way, by after-heating the cutting blade 3, the residual stress of the cutting blade 3 can be removed, and cracking and deformation can be prevented.

The processing step (step S107) shown in FIG. 11 is a step of machining and regenerating the specified leading edge part 31 and side edge parts 32 for the build-up welded portion of the after-heated cutting blade 3.

The build-up welded portion of the cutting blade 3 is machine and regenerated into a specified shape of the leading edge part 31 and the side edge parts 32 as explained above, as shown in FIG. 6 (*b*) and FIG. 8 (*b*).

In the preheating step, the build-up welding step, and the after-heating step shown in FIG. 11, the cutting blade 3 is moved by a handling robot 20 shown in FIG. 12.

In this configuration, if the cutting blade 3 is complicated in the shape of the leading edge part 31 and side edge parts 32, the cutting blade 3 can be moved swiftly and stably from the preheating step before the automatic build-up welding to the after-heating step after the automatic welding.

The regenerating equipment 1 of a cutting blade is explained by referring to FIG. 12. The regenerating equipment 1 of a cutting blade operates on the regenerating method of a cutting blade, and the cutting blades 3 to be repaired (the used and worn cutting blades shown in FIG. 1) are divided into plural groups A to E depending on the degree of abrasion, and can be regenerated in each one of groups A to D.

The regenerating equipment 1 of a cutting blade includes a chamfering machine (not shown) for chamfering the leading edge part 31 and side edge parts 32 of the cutting blade 3 belonging to each one of the groups A to D shown in FIG. 9 so as to pass the reference lines K1, K2, K3, K4(or reference planes passing the reference lines K) as the reference of build-up determined in each one of the groups A, B, C, D, a build-up welding machine (automatic welding machine) 50 for building up and welding on the chamfered leading edge part 31 and side edge parts 32, and a processing machine (not shown) for regenerating the build-up welded portion of the cutting blade 3 into a shape of specified (new) leading edge part 31 and side edge parts 32.

By the regenerating method of the cutting blade having such configuration, the procedure and action of regenerating a worn cutting blade 3 are explained below. First, as shown in FIG. 11, the cutting blade 3 to be repaired differing the degree of abrasion of the leading edge part 31 and side edge parts 32 is divided into, for example, five groups A to E depending on the degree of abrasion (W1 to W2), (W2 to W3), - - -, (W5 and over) (step S101). Next, as shown in FIG. 10, the leading edge part 31 and side edge parts 32 of the cutting blade 3 belonging to each one of the groups A to D are chamfered to the positions passing the reference lines K1, K2, K3, K4 (or reference planes passing the reference lines K) as the reference of build-up determined in each one of the groups A, B, C, D (step S102).

On each chamfered part T1, T2, T3, T4 of the chamfered leading edge part 31 and side edge parts 32, a build-up welding is applied (step S104). Afterwards, the built up and welded portion of the cutting blade 3 is regenerated into a specified shape of new leading edge part 31 and side edge parts 32 (step S107). In this way, the repaired cutting blade 3 is regenerated so as to be used again.

Therefore, according to this regenerating method of a cutting blade and the regenerating equipment of a cutting blade, the cutting blade 3 to be repaired differing in the degree of abrasion of the leading edge part 31 and side edge parts 32 is divided into plural groups A to D depending on the degree of abrasion, and, for example, the cutting blade 3 smaller in the degree of abrasion is chamfered to a position shallow from the surface (for example, a position passing K1) on the basis of the surface of new edge parts 31, 32, and the chamfered part T1 formed at this shallow position is built up and welded by a small amount, and edges 31, 32 similar to new products can be formed. Hence, the cutting blade small in the degree of abrasion can be repaired in a short time and labor in build-up welding and regenerating.

On the other hand, the cutting blade 3 larger in the degree of abrasion is chamfered to a position deep from the surface (for example, a position passing K4) on the basis of the surface of new edge parts 31, 32, and the chamfered part T4 formed at this deep position is built up and welded by a large amount, and edges 31, 32 similar to new products can be formed. Hence, the cutting blade large in the degree of abrasion can be repaired securely by building up and welding and regenerating as specified.

In this manner, the cutting blades 3 divided into groups A to D depending on the degree of abrasion are chamfered, built up and welded, and regenerated as specified in each one of the groups A to D, and each job determined in the groups A to D can be executed in the same condition. Therefore, the cutting blade 3 worn in the edge parts can be regenerated efficiently, and the quality of the regenerated cutting blade may be stabilized. At the same time, the running cost of the cutting blade 3 is saved substantially in the shearing type grinding machine using the cutting blade 3.

When the build-up welding is performed by an automatic welding machine 50, the worker's labor is saved, and the regenerating efficiency of the worn cutting blade 3 is enhanced, and the quality of the regenerated cutting blade can be stabilized. Further, the running cost of the cutting blade 3 is saved substantially in the shearing type grinding machine.

Further, as shown in FIG. 2 and FIG. 9, on the basis of the width dimension W in the thickness direction of the blade tip 127 of the cutting blade 3, the cutting blades 3 are divided into plural groups A to E, and the degree of abrasion in the width direction of the side edge part 32 formed on the side outer edge including the blade tip 127 of the cutting blade 3 can be measured accurately. Hence, the side edge part can be chamfered appropriately to a position passing the reference lines K1, K2, - - - (or reference planes passing the reference lines K) as the reference for build-up height determined in each one of the groups A to D. In this way, when chamfered appropriately, the chamfered parts T1, T2, - - - can be built up and welded by a necessary amount, so that the width dimension W in the thickness direction of the cutting blade 3 in the side edge part 32 can be regenerated to dimension W1 same as in a new product.

As a result, for example, when shearing and grinding the objects by mutual overlapping of the side edge parts 32 formed on two rotating blades 3 formed oppositely to each other, the gap between the side edges 32 can be corrected nearly to a design value (for example, 0.5 to 1.0 mm), so that the objects can be sheared and ground efficiently.

The regenerating equipment of a cutting blade is more specifically described by reference to FIG. 12 to FIG. 30. FIG. 12 is a plan view of the regenerating equipment of a cutting blade, showing principal parts.

As shown in FIG. 12, the build-up welding configuration of the regenerating equipment 1 of a cutting blade is provided within a partition wall 2 sectioned in a specified range, and includes a loading-unloading machine 15 for putting the cutting blade 3 in and out of the partition wall 2, a handling robot 20 for moving the cutting blade 3 to a specified position within the partition wall 2, a preheating machine 60 for preheating the cutting blade 3 to a specified temperature, a multi-axis holding machine 40 for keeping the preheated cutting blade 3 at a specified welding position, an automatic welding machine 50 (welding robot) for automatically building up and welding a hardening build-up welding material on the cutting blade 3 held by this multi-axis holding machine 40, and an after-heating machine 70 for gradually cooling and after-heating the built up and welded cutting blade 3. The loading-unloading machine 15 is provided with a platform 16 on which the cutting blade 3 is placed, and this platform 16 is moved in and out of the partition wall 2 by a conveying unit 17

The working range W20 of the handling robot 20 includes a waiting part 4 for holding a plurality of cutting blades 3 at specified addresses, a tab table 6 for mounting a tab to be used in welding, a slag removing brush 7, and a welding torch regulator 56 for cleaning the welding torch 55 of the automatic welding machine 50. The cutting blades 3 disposed at specified addresses of the waiting part 4, and the types, preheating time and other data of the cutting blades 3 supplied into a control device 80 described below. At this time, information showing "the cutting blade requiring manual correction" mentioned below is waiting at which address is also put into the control device 80. The tab 5 is also disposed at a specified position on the tab table 6.

Further, outside of the partition wall 2, the control device 80 is provided for controlling the operations of the handling robot 20, the multi-axis holding machine 40, and the automatic welding machine 50, on the basis of disposition coordinates of the cutting blades 3 disposed at specified addresses, disposition coordinates of the tab 5, and disposition coordinates of other devices. This area further includes a preheating and after-heating machine control device 81 for controlling the temperature of the preheating machine 60 and the after-heating machine 70, and a manual correction welding machine 83 for correcting the cutting blades 3 at a judging part 82 formed on the loading-unloading machine 15 outside of the partition wall 2.

The handling robot 20 moves the cutting blade 3 disposed on the waiting part 4 to the preheating machine 60, moves from the preheating machine 60 to the multi-axis holding machine 40, moves from the multi-axis holding machine 40 to the after-heating machine 70, and moves between the preheating machine 60 and the after-heating machine 70 and the loading-unloading machine 15, and is capable of moving the cutting blade 3 within the working range W20. It is also capable of holding the tab 5 and the brush 7 on the tab table 5, and contacting with the cutting blade 3 held on the multi-axis holding machine 40.

The preheating machine 60 has a function of preheating the cutting blade 3 to a temperature suited to build-up welding.

The preheating machine 60 has a function of holding the cutting blade 3, and changing the position of the cutting blade 3 depending on the position of build-up welding.

The automatic welding machine 50 is a multi-axis automatic welding robot, and is capable of changing the position of the welding torch 55 within the working range W50, and the welding torch regulator 56 has a function of adjusting the wire length of leading end of the welding torch 55, removing the sputter of the torch, and cleaning the inside of the torch.

The after-heating machine 70 has a function of cooling slowly and after-heating the cutting blade 3 entered from an opening 71 by the handling robot 20 at a specified temperature. In this after-heating machine 70, the cutting blade 3 disposed on the platform 72 in the rear part of the opening 71 is delivered, and the after-heated cutting blade 3 may be discharged sequentially from an opening at the opposite side of the opening 71.

Figure 13:
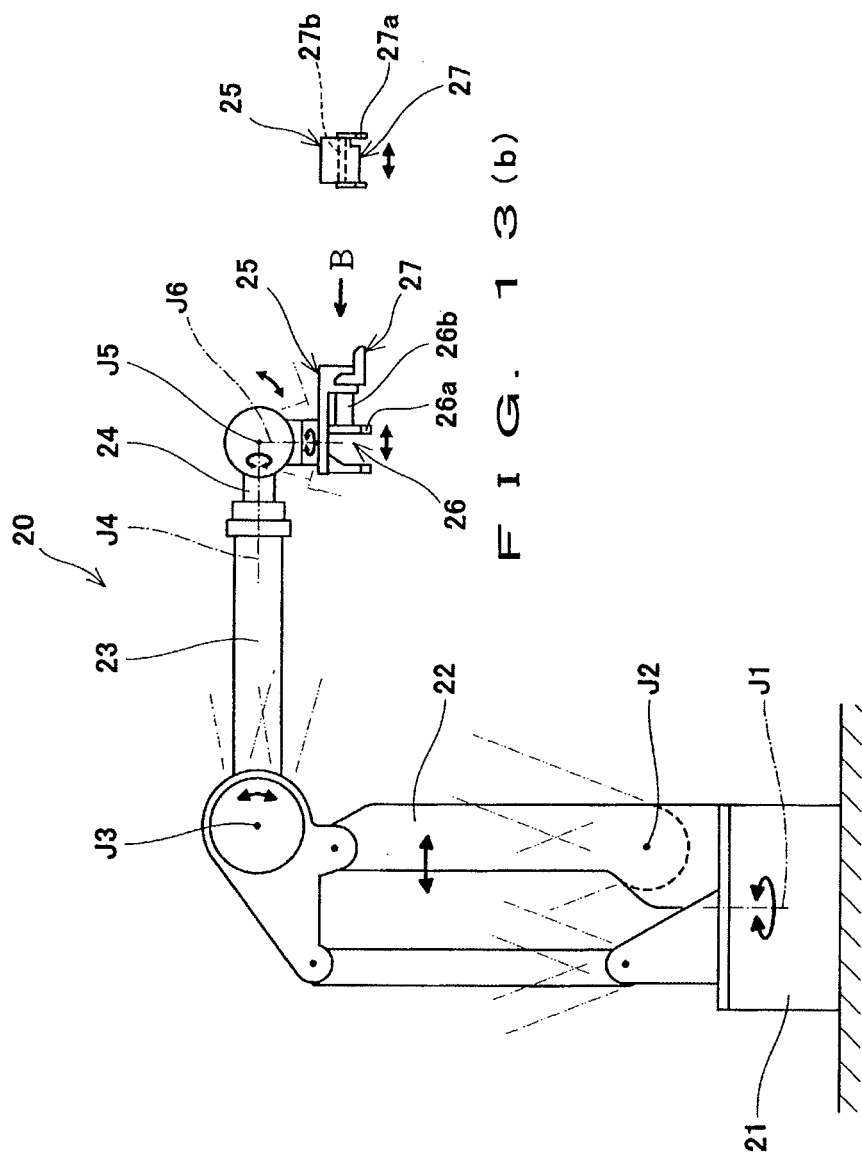
FIG. 13 a diagram showing a handling robot of the regenerating equipment shown in FIG. 12, (a) being a side view, and (b) being a view of B shown in FIG. 13(a).
Figure 14:
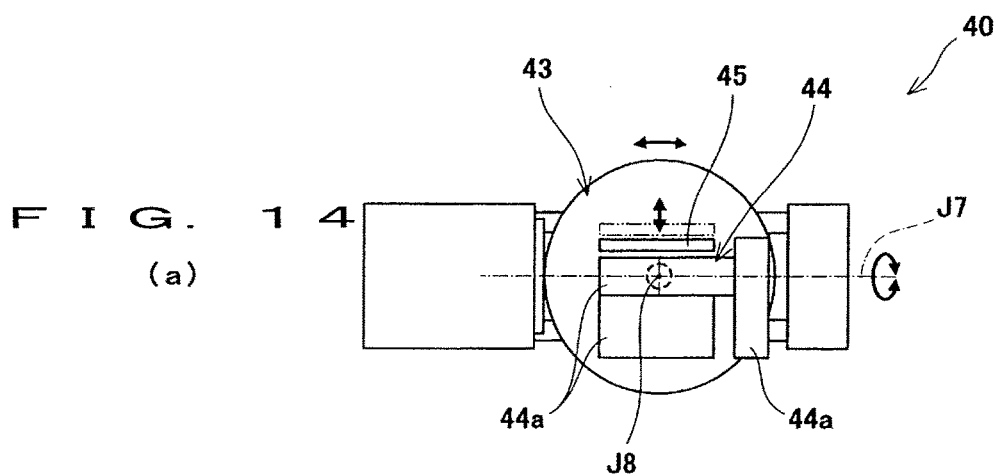
FIG. 14 a diagram showing a multi-axis holding machine of the regenerating equipment shown in FIG. 12, (a) being a plan view, and (b) being a side view.
Figure 14:
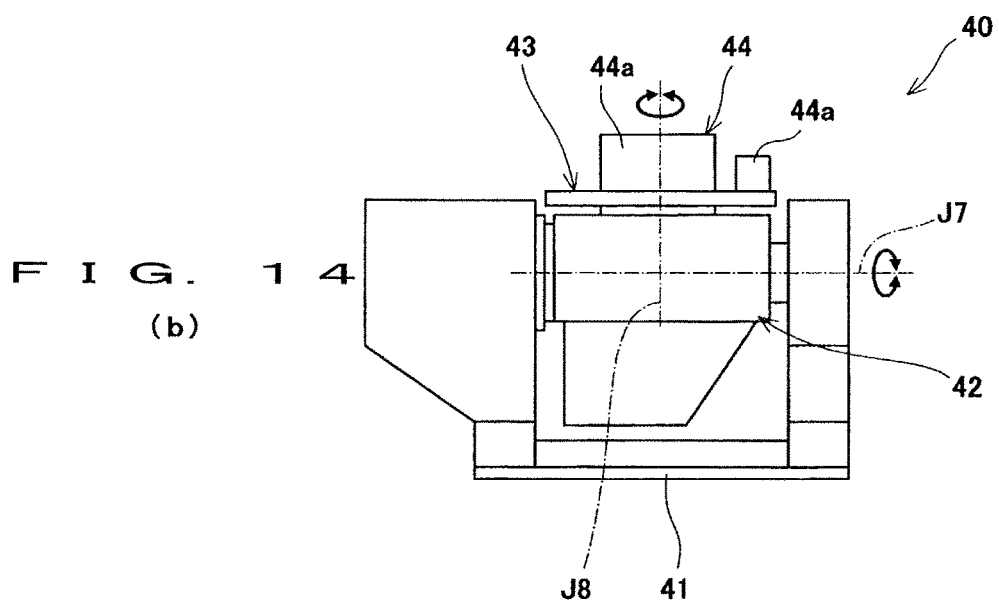

FIG. 13 is a diagram of the handling robot 20 of the regenerating equipment shown in FIG. 12, and (a) is a side view, and (b) is an arrow view VII shown in (a). FIG. 14 is a diagram showing the multi-axis holding machine 40 of the regenerating equipment 1 shown in FIG. 12, and (a) is a plan view, and (b) is s side view.

As shown in FIG. 13 (a), the handling robot 20 is a multi-joint robot, including a base 21 fixed on the floor, a lower arm 22, an upper arm 23, and a wrist 24. The lower arm 22 is provided on the base 21 rotatable about a perpendicular first axis J1 at the lower end part, and is provided on the base 21 capable of moving angularly before and after around a horizontal second axis J2. At the upper end part of the lower arm 22, the base end part of the upper arm 23 is disposed, so as to be movable angularly up and down around a horizontal third axis J3. The wrist 24 provided at the leading end of the upper arm 23 is disposed so as to be changed angularly around a fourth axis J4 horizontal to the axial line of the upper arm 23, and is movable angularly about a fifth axis J5 orthogonal to the axial line of the upper arm 23. A gripping part 25 provided on the wrist 24 is movable angularly about a sixth axis J6 orthogonal to the fifth axis J5.

The gripping part 25 includes a first gripping part 26 capable of gripping the cutting blade 3 preheated to a high temperature (FIG. 12) by a movable piece 26a, and a second gripping part 27 having a movable piece 27a moving in a direction orthogonal to the first gripping part 26 as shown in FIG. 13 (b).

Driving of each part corresponding to the axes J1 to J6 of the multi-axis robot 20 is executed by each servo motor not shown, and by these servo motors, the position of the robot 20 is controlled, and the gripping part 25 is moved within the working range W20 (FIG. 12). The first gripping part 26 and the second gripping part 27 of the gripping part 25 are opened and closed by hydraulic cylinders 26b, 27b.

As shown in FIG. 14 (a), (b), the multi-axis holding machine 40 (positioner) includes a platform 41 fixed on the foundation, an inclination part 42, a rotation part 43, and a holding part 44. The inclination part 42 is disposed on the platform 41 so as to be inclined around a horizontal seventh axis J7. The rotation part 43 is provided so as to be rotatable around an eighth axis J8 orthogonal to the seventh axis J7 on the inclination part 42. The holding part 44 has a positioning holding part 44a and a fixing member 45 so as to hold the cutting blade 3 (FIG. 12) at a specified position on the rotation part 43. The fixing member 45 is a movable element, and holds the cutting blade 3 together with the positioning holding part 44a. Hence, the cutting blade 3 held by the holding part 44 is controlled in position by rotation by the rotation part 43 and inclination by the inclination part 42.

Figure 15:
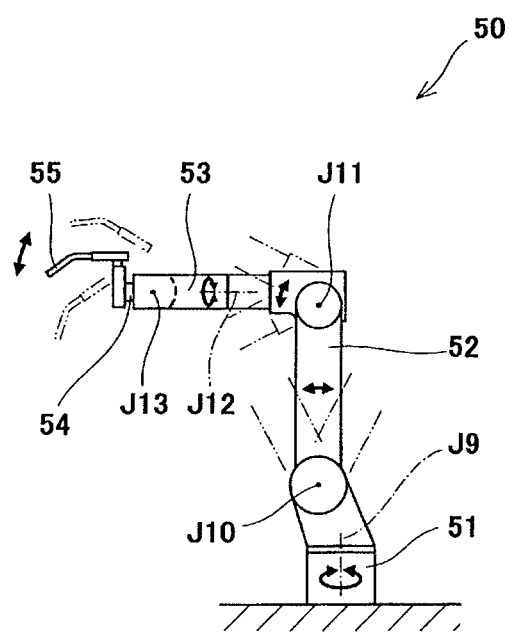
FIG. 15 is a side view showing an automatic welding machine of the regenerating equipment shown in FIG. 12.

As shown in FIG. 15, the automatic welding machine 50 is a multi joint robot, and includes a platform 51 fixed on the floor, a lower arm 52, an upper arm 53, and a wrist 54. The lower arm 52 is provided on the platform 51 so that the lower end may be rotatable about a perpendicular ninth axis J9, and provided on the platform 51 so as to be moved angularly before and after about a horizontal tenth axis J10. At the upper end of the lower arm 42, the base end part of the upper arm 53 is provided movable angularly up and down around a horizontal eleventh axis J11. The wrist 54 provided at the leading end of the upper arm 5 is provided so as to be rotatable about a twelfth axis J12 horizontal to the axial line of the upper arm 53, and is also movable angularly around a thirteenth axis J13 orthogonal to the axial line of the upper arm 53. The welding torch 55 mounted on the wrist 54 is movable angularly by the control of the wrist 54.

The welding torch 55 provided on the wrist 54 is controlled in position by driving the lower arm 52, the upper arm 53, and the wrist 54 by servo motors not shown. This position control of the welding torch 55 is carried out along with the position control of the cutting blade 3 by the multi-axis holding machine 40. The welding torch 55 is movable within the working range W50.

Figure 16:
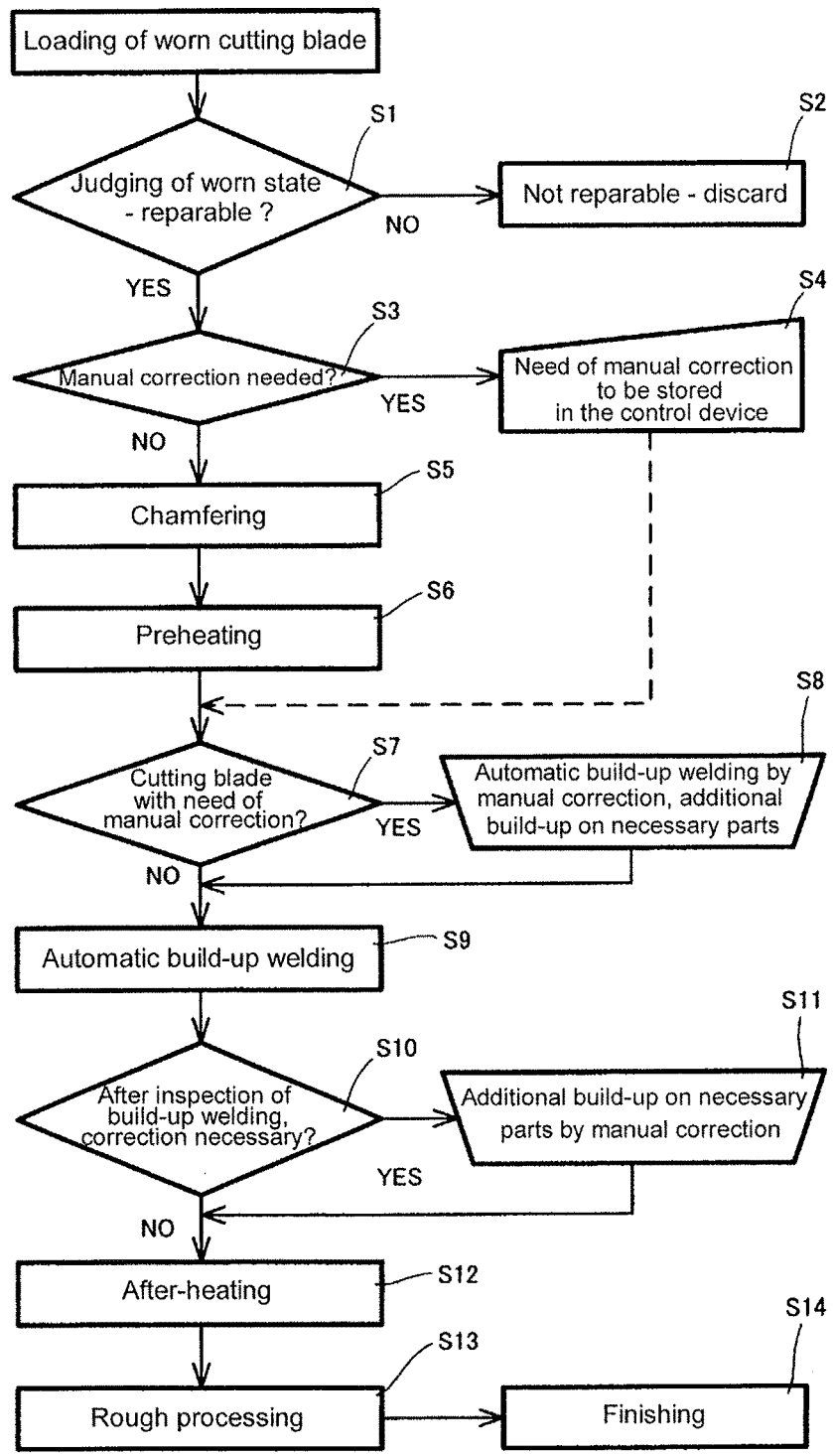
FIG. 16 is a flowchart showing a regenerating method of a cutting blade of the regenerating equipment shown in FIG. 12.

FIG. 16 is a flowchart showing a regenerating method of a cutting blade by the regenerating equipment 1 shown in FIG. 12. By referring to this flowchart and FIG. 12, the regenerating method of the cutting blade 3 by the regenerating equipment 1 is explained below.

<Judging>

First, when a worn cutting blade 3 is put in place, it is judged whether it can be repaired or not depending on the worn state of the cutting blade 3 (step S1). By this judging, if judged not reparable, it is discarded without being regenerated (step S2). If judged reparable, the cutting blade 3 is judged whether manual correction is necessary or not (step S3). If manual correction is judged to be necessary, the need of manual correction is fed and stored in the control device 8 (step4). Whether manual correction is necessary or not is determined if a defect causing "short stop" is present or not.

In this judging step, as shown in step S101 in FIG. 11, the worn cutting blades 3 are divided into groups (A to E). The cutting blade 3 classified in group E is judged to be not reparable (step S2).

<Necessary Processing>

When judged to be reparable, the leading edge part 31 and side edge parts 32 are chamfered as required (step S5). This chamfering process is done by about 45° to a position passing the build-up reference line K determined in each group as explained in step S102 in FIG. 11. This chamfering is intended to make uniform the worn edge parts 31, 32, to stabilize the welding by keeping the arc length constant, to make uniform the quality of weld metal, and to make uniform the hardness. The chamfering process is carried out depending on the build-up height of build-up welding, and the type of hardening build-up welding material.

Chamfering is processed on a flat plane, but instead it may be also formed on a concave curved surface or the like.

<Preheating Process>

Preheating process is performed for a specified time by a preheating machine 60 capable of preheating to a temperature suited to build-up welding depending on the material or size of the cutting blade 3 (step S6, S103).

<Manual Correction>

If the cutting blade 3 preheated to a specified temperature in the preheating step is judged to require manual correction (step S7), the cutting blade 3 is transferred to the judging part 82 by the loading-unloading machine 15, and is manually corrected by the worker M (step S8). In this manual correction, build-up welding is applied on the edge parts 31, 32 so as not to cause problem in automatic welding by the nest automatic welding machine 50.

<Build-Up Welding>

The cutting blade 3 not requiring manual correction or the manually corrected cutting blade 3 is processed by the automatic welding machine 50, and the edge parts 31, 32 are built up and welded 30 as described below (step S9, S104, S105). This build-up welding 30 is performed as explained in steps S104, S105 in FIG. 11.

The build-up welding 30 is arc welding applied to the chamfered edge parts 31, 32. At the time of build-up welding, the edge parts 31, 32 are continuously processed from one end to other end while controlling the axes J1 to J13 so as to achieve the optimum position by the welding position of the cutting blade 3 preliminarily entered in the control device 80, the coordinates of the multi-axis holding machine 40, and the coordinates of the leading end of the welding torch 55 of the automatic welding machine 50.

<Checking>

After the build-up welding 30, the worker checks if the built-up height formed by the build-up welding 30 is insufficient or not (step S10). If the built-up height is insufficient, it is corrected manually, and a necessary amount is built u and welded (step S11).

<After-Heating>

The cutting blade 3 after build-up welding 30 on the leading edge part 31 and side edge parts 32 as mentioned above is then slowly cooled or after-heated at a specified temperature (step S112, S106). By this after-heating process, build-up welding 30 by hardening build-up welding material on the edge parts 31, 32 of the worn cutting edge 3 is completed.

<Rough Processing>

The cutting blade 3 after build-up welding 30 is roughly processed, first by a vertical milling machine or the like, and extra portion of the built up and welded side edge parts 32 and leading edge part 31 is cut off (side S13).

<Finishing> (Regenerating)

Next, by a rotary grinding machine or the like, the both sides are ground, and the leading edge part 31 is grounded. The leading edge part 31 and side edge parts 32 of the cutting blade 3 are regenerated, and finished to edge parts of same shape as the specified new cutting blade 3 (step S14, S107).

The machining processes of rough processing and finishing may be carried out, for example, by a machine tool (machining center) having an automatic tool exchange function of exchanging automatically a plurality of cutting tools stored in a tool magazine, capable of automatically exchanging tools by commands from the computer numerical control (CNC) depending on the purpose, and machining different type by one machine.

Figure 17:
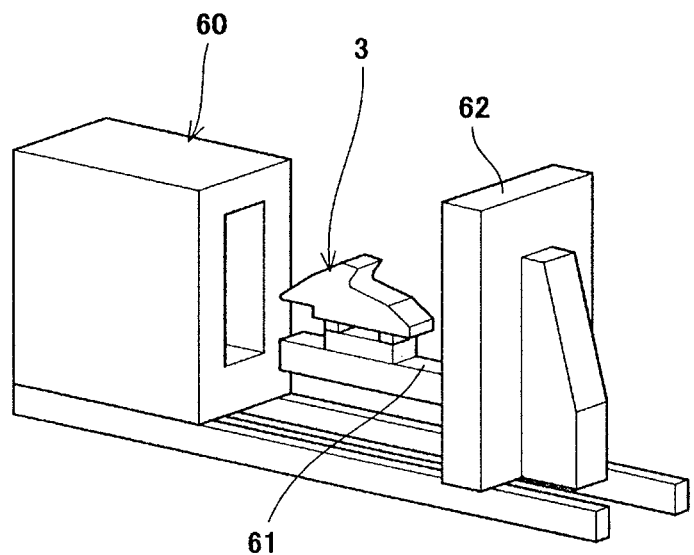
FIG. 17 is a perspective view showing a state of moving a cutting blade to a preheating machine of the regenerating equipment of the embodiment.

Referring now to FIG. 17 to FIG. 27, the principal processes shown in the flowchart in FIG. 17 are described below specifically. In the following explanation, too, referring to an example of split type cutting blade 3, same reference numerals are given to the same components, and repeated explanations are omitted.

Figure 18:
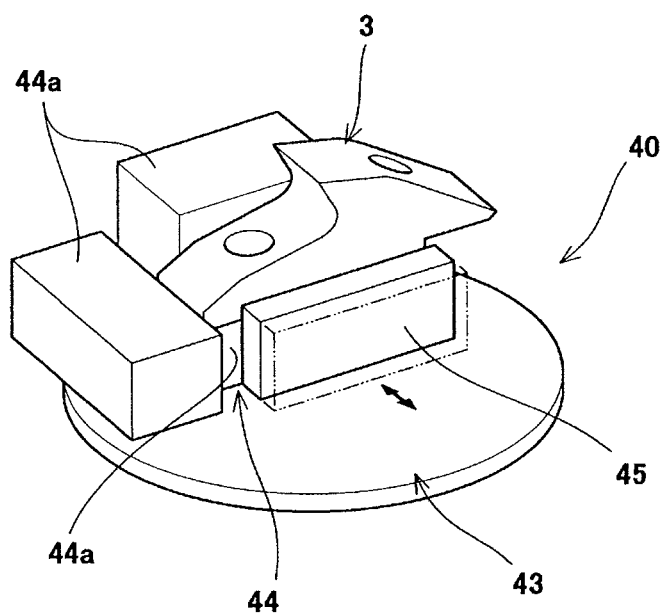
FIG. 18 is a perspective view showing a state of holding of a cutting blade on a multi-axis holding machine of the regenerating equipment of the embodiment.

FIG. 17 is a perspective view showing a state of moving of the cutting blade 3 to the preheating machine 60 at the time of preheating (step S6) in the flowchart shown in FIG. 16. FIG. 18 is a perspective view showing a state of holding of the cutting blade 3 after the preheating process on the multi-axis holding machine 40 in the flowchart shown in FIG. 16 (step S9).

As shown in FIG. 17, the preheating machine 60 is designed to slide a platform 61 on which the cutting blade 3 is placed, and a lid body 62 for opening and closing integrally with the platform 61 in a horizontal direction, and as shown in the diagram, when the lid body 62 is closed in a state of mounting the cutting blade 3 on the platform 61, the cutting blade 3 is put into the preheating machine 60. This mounting of the cutting blade 3 on the platform 61 of the preheating machine 60 is achieved by moving the cutting blade 3 disposed at a specified address of the waiting part 4 by gripping by the handling robot 20. By this preheating machine 60, the cutting blade 3 is preheated to a temperature suited to build-up welding (for example, about 150 to 500° C.) depending on the material and size of the cutting blade 3.

As shown in FIG. 18, the cutting blade 3 after preheating by the preheating machine 60 is moved to the multi-axis holding machine 40 by the handling robot 20, and is held in the holding part 44 of the multi-axis holding machine 40. Holding of the cutting blade 3 is held when the cutting blade 3 moved by the handling robot 20 so as to contact with a position holding member 44a of the holding part 44 is enclosed and held between the fixing member 45 and the position holding member 44a.

If manual correction is judged to be necessary in the manual correction judging step shown in FIG. 16 (step S3), the cutting blade 3 is moved to the judging part 82 by the loading-unloading machine 15 before being held in the multi-axis holding machine 40, and is corrected manually (FIG. 12).

Figure 21:
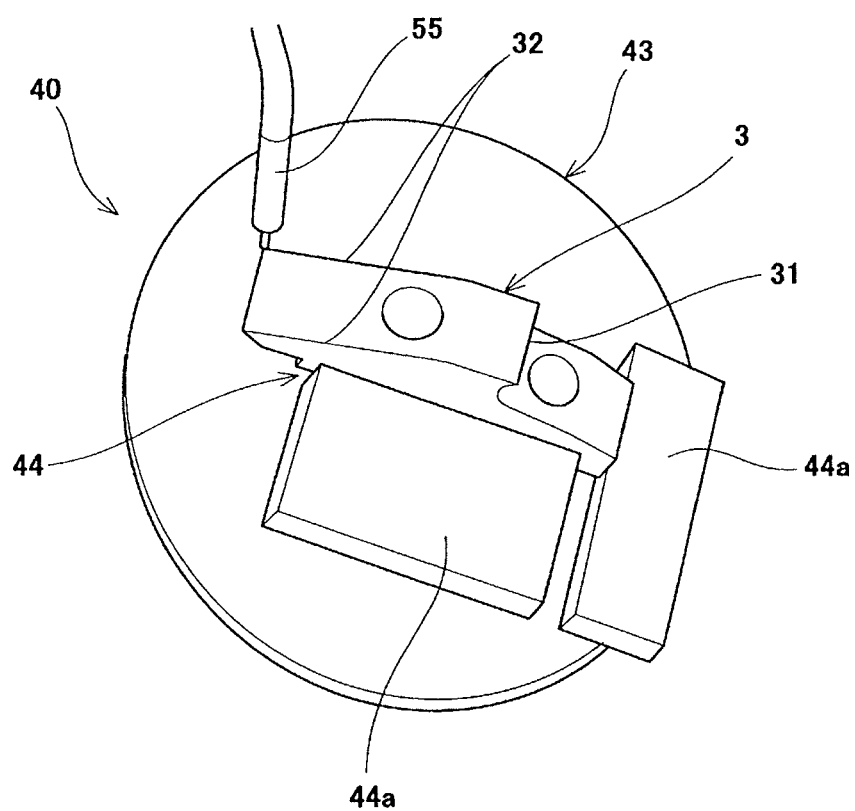
FIG. 21 is a perspective view showing a state of build-up welding on side edge parts of a cutting blade by an automatic welding machine of the regenerating equipment of the embodiment.
Figure 22:
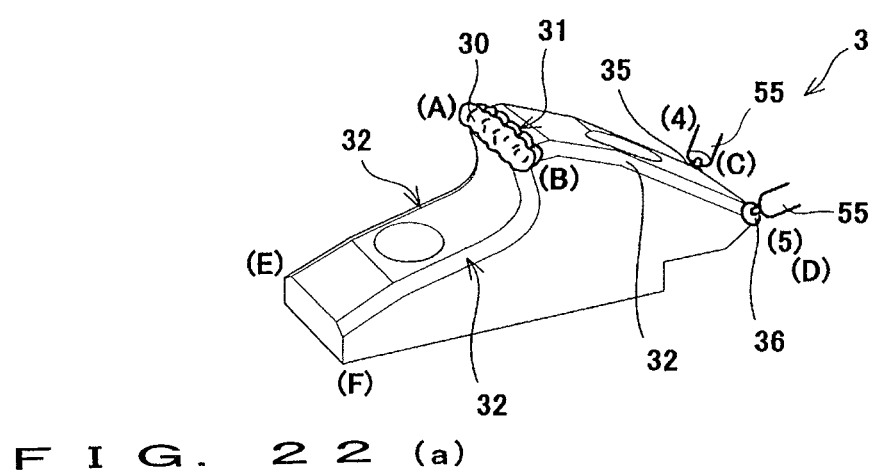
FIG. 22 (a) and (b) are perspective views showing a procedure of build-up welding of the side edge parts shown in FIG. 21.
Figure 22:
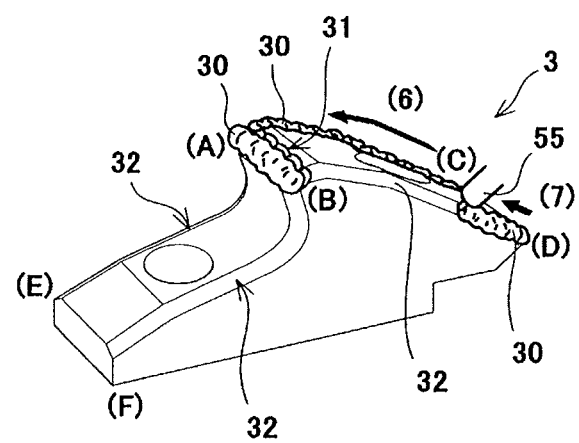
Figure 23:
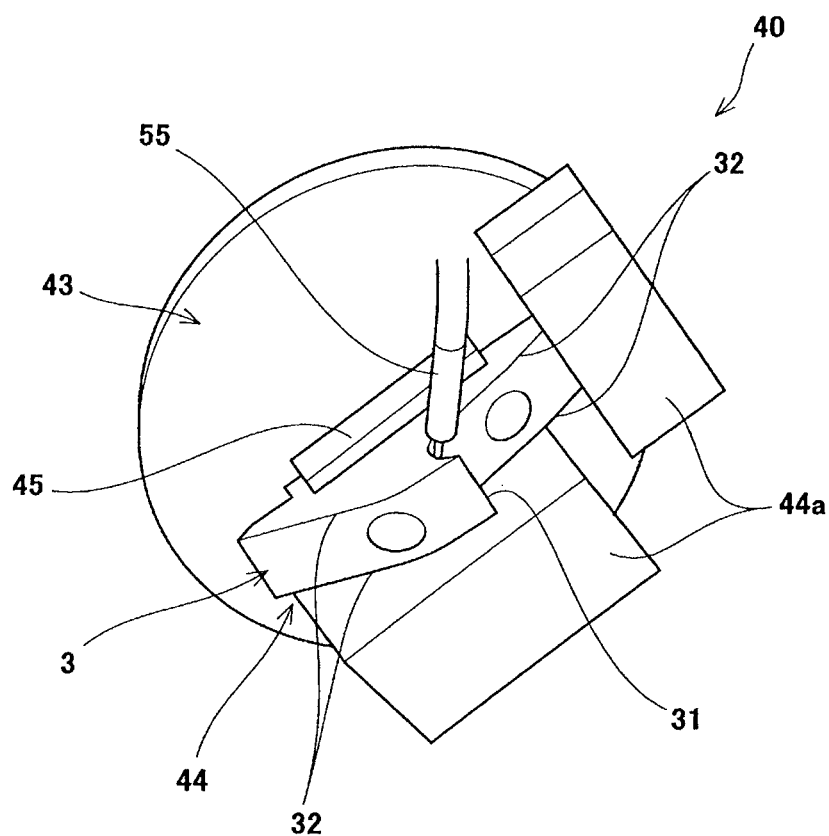
FIG. 23 is a perspective view showing a state of build-up welding on side edge parts different from the side edge parts shown in FIG. 22.
Figure 24:
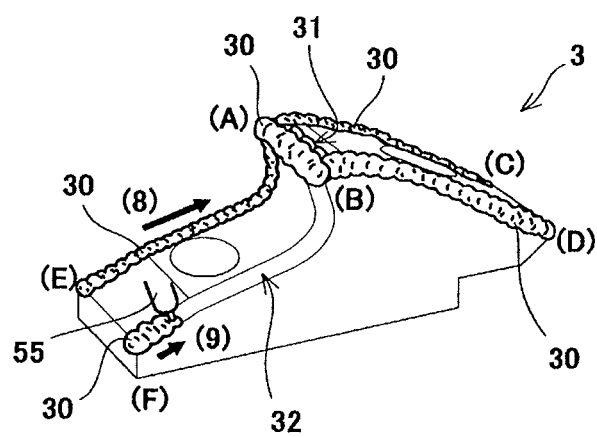
FIG. 24 is a perspective view showing a state of build-up welding on side edge parts shown in FIG. 23.

FIG. 19 is a diagram showing a state of welding of the leading edge part 31 if the cutting blade 3 at the time of build-up welding (step S9) in the flowchart shown in FIG. 16, and FIG. 19 (a) is a perspective view, and FIG. 19 (b) is a side view. FIGS. 20 (a) to (c) are perspective view showing the procedure of welding of the leading edge part 31 shown in FIG. 19. FIG. 21 is a perspective view showing a state of welding of side edge parts 32 of the cutting blade 3 at the time of build-up welding (step S9), and FIGS. 22 (a), (b) are perspective views showing the procedure of welding of the side edge parts 32 shown in FIG. 21. FIG. 23 is a perspective view showing a state of welding of the side edge part 32 different from the side edge part 32 shown in FIG. 21. FIG. 24 is a perspective view showing the procedure of welding of the side edge part 32 shown in FIG. 23. In FIG. 20, FIG. 22, and FIG. 24, for the convenience of explanation, the cutting blade 3 is held in a horizontal position, and the angular positions of the cutting blade 3 are identified with symbols (A) to (F), and the working steps are sequentially numbered from (1) to (9).

As shown in FIG. 19 (a), the build-up welding on the edge parts 31, 32 of the cutting blade 3 held on the multi-axis holding machine 40 is first performed on the leading edge part 31. The leading edge part 31 is pointed to the rotation direction side, and by the handling robot 20, and with the tab 5 in contact with the opposite side (lower side) (hereinafter possibly called the anti-welding machine side) of the welding machine 50 in the leading edge part 31, the build-up welding is performed by the welding torch 55 of the automatic welding machine 50 from the upper side. That is, as shown in FIG. 19 (b), by welding from the upper side by the welding torch 55, with the tab 5 fitted to the opposite side (the anti-welding machine side) of the welding torch 55 so as to be along the lower side of the leading edge part 31, the thickness of the build-up welding is prevented from being built up to the opposite side of the welding torch 55, and the regenerating process (finishing process) to the leading edge part 31 after welding may be done easily. This tab 5 (patch plate) is made of a metal block such as fire-proof ceramic block or copper.

The welding position by the welding torch 55 is, in principle, a downward welding toward the immediately lower direction of the leading end of the welding torch 55, and the position of the cutting blade 3 is held so as to be in a horizontal or slightly climbing position. This welding position is controlled by the multi-axis holding machine 40 so that the position of the cutting blade 3 may be optimum, and the position of the welding torch 55 may be controlled by the automatic welding machine 50.

As shown in FIG. 20 (a) to (c), the detail of build-up welding on the leading edge part 31 is performed as shown in FIG. 20 (a), in which by the welding torch 55, arc spot build-up welding 33, 34 is sequentially applied at positions [welding start points] at both ends (A), (B) in thickness direction of leading edge part 31 [(1), (2)]. This welding is build-up welding at welding base point of step S104 in FIG. 11. Next, as shown in FIG. 20 (b), build-up welding 30 is applied continuously between arc spot build-up welding 33, 34 of the leading edge part 31 [(3)]. This build-up welding 30 is applied from position (A) of arc spot build-up welding 33 toward position (B), and it is intended to prevent welding drooping effectively by arc spot build-up welding 33, 34. Further, as shown in FIG. 20 (c), in this example, two layers of build-up welding 30 are applied. The build-up welding 30 on the leading edge part 31 is most heavily worn, and two layers or more should be desired.

Next, as shown in FIG. 21, build-up welding is applied on side edge parts 32 of the cutting blade 3. This build-up welding is flat welding, as welding position by welding torch 55, directed downward at the leading end of the welding torch 55 in principle, and the position of the cutting blade 3 is controlled so as to be slightly in climbing style from the horizontal position. This welding position is also controlled by the multi-axis holding machine 40 so that the position of the cutting blade 3 may be an optimum position, and the position of the welding torch 55 is controlled by the automatic welding machine 50.

As shown in FIGS. 22 (a), (b), build-up welding 30 on the side edge parts 32 is performed as shown in FIG. 22 (a), arc spot build-up welding 35, 36 is sequentially applied at positions at both ends (C), (D) in thickness direction of acute angle part at the end of the anti-rotational direction of the cutting blade 3 [(4), (5)], and then as shown in FIG. 22 (b), build-up welding 30 is applied continuously from positions (C), (D) at end parts of arc spot build-up welding 35, 36 toward positions (A), (B) of the leading edge part 31 [(6), (7)]. This build-up welding 30 is applied from the position (C) of the earlier arc spot welding 35 toward the position (A) of the leading edge part 31, and is also intended to prevent welding drooping effectively by arc spot build-up welding 35, 36.

Further, as shown in FIG. 23, build-up welding is applied to other side edge part 32 having the leading edge part 31 at the opposite side. This build-up welding is flat welding, as welding position by welding torch 55, directed downward at the leading end of the welding torch 55 in principle, and the position of the cutting blade 3 is controlled so as to be slightly in climbing style from the horizontal position. This welding position is also controlled by the multi-axis holding machine 40 so that the position of the cutting blade 3 may be an optimum position, and the position of the welding torch 55 is controlled by the automatic welding machine 50.

As shown in FIG. 24, build-up welding 30 on this side edge part 32 is performed from positions (E), (F) at both ends in the rotational direction of the side edge part 32, toward positions (A), (B) of the leading edge part 31, continuously [(8), (9)]. The positions (E), (F) at both ends in the rotational direction are not an acute angle at the end portion corner, and the build-up welding 30 is applied without requiring arc spot welding 35, 36 as mentioned above.

Figure 25:
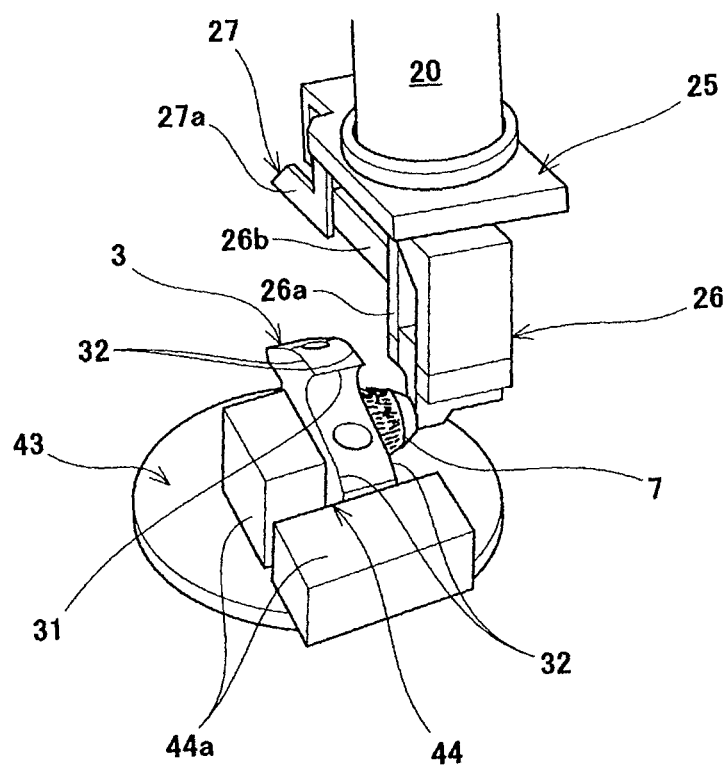
FIG. 25 is a perspective view showing a state of removal of slag after the build-up welding of side edge parts shown in FIG. 24.

FIG. 25 is a perspective view showing a state of removal of slag after welding on the side edge part shown in FIG. 24. As shown above, when the build-up welding 30 (FIG. 24) is complete between the leading edge part 31 and the side edge parts 32 of the cutting blade 3, in order to remove the slag of the build-up welding 30, the handling robot 20 grips the brush 7 by the first gripping part 26, and moves the brush 7 long the side edge parts 32, so that the slag is removed.

By making use of this slag removing time, the welding torch 55 of the automatic welding machine 50 prepares for next welding, and adjusts the wire by the welding torch adjusting machine 56 shown in FIG. 12, removes the sputter of the torch, cleans the inside of the torch, and adjusts the wire length.

When welding plural layers of build-up welding on the side edge parts 32, the welding running direction is inverted in the odd-number layer and the even-number layer, so that the recess at the welding bead end part may be distributed.

FIG. 26 (a) is a perspective view showing a state of inspection (step S10) after build-up welding in the flowchart in FIG. 16, and FIG. 26 (b) is a perspective view showing a state of manual correction. As shown in the diagram, when the build-up welding 30 by the automatic welding machine 50 is complete, the cutting blade 3 is once carried out to the judging part 82 by the loading-unloading machine 15, and it is inspected visually by the worker M (FIG. 12). This inspection is shown in FIG. 26 (a), in which the build-up height and other conditions of the build-up welding are inspected by an inspecting instrument 84. By this inspection, if the build-up height is insufficient, as shown in FIG. 26 (b), the worker M manipulates the welding torch 83a of the manual correction welding machine 83 (FIG. 12), and builds up and corrects by manual work.

Figure 27:
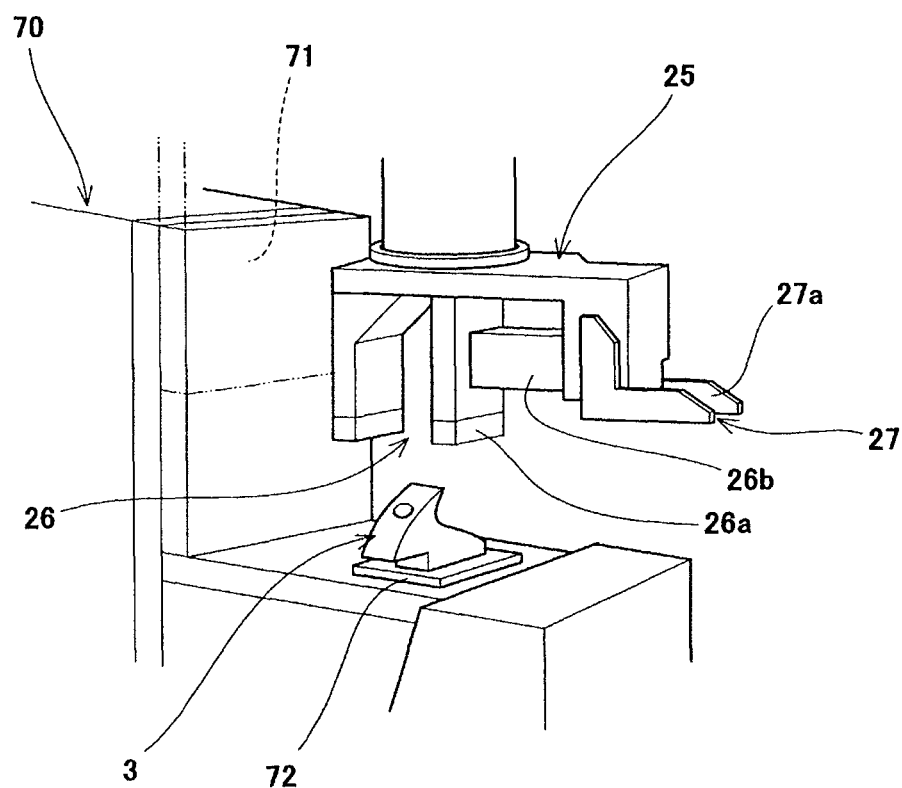
FIG. 27 is a perspective view showing a state of moving of a cutting blade at the time of after-heating to an after-heating machine of the regenerating equipment of the embodiment.

FIG. 27 is a perspective view showing a state of moving the cutting blade 3 on the after-heating machine 70 in the after-heating step (step S12) in the flowchart in FIG. 10. After the inspection, the cutting blade 3 is carried again into the inside of the partition wall by the loading-unloading machine 15 (FIG. 12), and is put on the platform 72 of the after-heating machine 70 by the handling robot 20, and is put into the after-heating machine 70 from the opening 71. The cutting blade 3 is after-heated for a specified time in the after-heating machine 70.

The cutting blade 3 thus after-heated by the after-heating machine 70 is returned to the specified address at the waiting part 4 by the handling robot 20 (FIG. 12). The after-heating cutting blade 3 is roughly processed and finished by the processing machine not shown, and the cutting blade 3 is completely regenerated same as in brand-new leading edge part 31 and side edge parts 32.

Such regenerating method of the cutting blades shown in FIG. 17 to FIG. 27 is an explanation when the cutting blade 3 includes a portion requiring manual correction, and the process of manual correction can be omitted in the case of the cutting blade 3 not requiring preventing of "short stop" during automatic operation by the automatic welding machine 50 due to manual correction.

FIG. 28 (a) is a side view showing a rotary blade 10 having a cutting blade 3 disposed shown in FIG. 27, and FIG. 28 (b) is side view showing other cutting blade 11.

As shown in FIG. 28 (a), in the regenerated split type cutting blade 3, in the state being fitted around the blade rest 106 (same composition as in FIG. 30), the hardening build-up welding material is applied on the entire outer periphery of the leading edge part 31 and the side edge parts 32, and the built up and welded rotary blade 10 can be regenerated, and the cost can be saved substantially as compared with a case of replacing with a new part, and the shearing type grinding equipment lowered in the running cost of the cutting blades 3 is realized. Moreover, the entire outer peripheral parts of the edge parts of the rotary blade 10 rotating in the rotational direction R are made of hardening build-up welding material, and the rotary blade 20 large in hardness of the edge parts 31, 32 can be formed.

Further, as shown in FIG. 28 (b), in this embodiment, an example of split type cutting blade 3 is explained, but an integral type cutting blade 11 may be regenerated similarly. In the case of an integral type cutting blade 11 having the cutting blade 3 and the blade rest 106 formed integrally, the multi-axis holding machine 40 holds the integral type cutting blade 11 and is capable of controlling the position, and the wide edge part 32 from the end part of the leading edge part 31 to the end part of the next leading edge part 31 is continuously built up and welded automatically. By this integral type cutting blade 11 built up and welded 30 in the leading edge part 31 and the side edge parts 32, the leading edge part 31 and the side edge parts 32 responsible for the toughest works can be made of hardening build-up and welding materials of large hardness, and the integral type cutting blade 11 can be regenerated, and the cost can be saved as compared with replacement with new parts. Further, the shearing type grinding equipment lowered in the running cost of the integral type cutting blade 11 is realized. Thus, the invention is not limited to the split type cutting blade 3 alone, but may be similarly applied to the integral type cutting blade 11.

In the regenerating equipment 1 of the embodiment, mainly a configuration of forming a build-up welding 30 on the cutting blade 3 to be regenerated is described, but the grinding equipment is more preferably structured by disposing various devices so as to operate continuously, including the chamfering machine on the edge parts 31, 32 of the loaded cutting blade 3, processing devices on the edges 31, 32 of the cutting blade formed by build-up welding 30 (such as vertical milling machine, rotary grinder, and others), and the machine configurations of the embodiment are only examples, and the configuration of the machines is not limited to the embodiment alone.

Further, the described embodiment is only an example, and it may be freely changed or modified within a range not departing from the true spirit of the invention, and the invention is not limited by the illustrated embodiments alone.

The cutting blade that can be regenerated by the regenerating method of a cutting blade of the invention is somehow limited depending on the degree of abrasion. In other words, when a worn cutting blade is formed nearly in same dimensions as in a new product by build-up welding, there is a certain limit for forming the build-up weld part to a desired height.

Further, as shown in FIG. 8 (b), when the relief surface build-up weld zone 131a after the regenerating processing is formed nearly on a same plane as the outer circumference 3b of the main body of the cutting blade 3 on which they are formed, it is significant to regenerate the cutting blade 3 in which the worn amount of the relief surface 132 is smaller than a specified amount.

That is, if the worn amount of the relief surface. 132 is more than a specified amount (for example, 10 mm), the relief surface 132 after the regenerating process becomes smaller than the dimension in the radius direction due to such wearing, and hence, as shown in FIG. 29, the gap increases between the relief surface 132 of the cutting blade 3 and the outer circumference of the spacer 104, and the grinding objects cannot be grounded effectively between the blade tip 127 of the cutting blade 3 and the outer circumference of the spacer 104.

INDUSTRIAL APPLICATION

As described herein, the regenerating method of a cutting blade, its regenerating equipment, and the cutting blade for a shearing type grinding machine of the invention are characterized by excellent effects of regenerating the cutting blade worn in the leading edge part and side edge parts so as to regenerate into a cutting blade of stable high quality efficiently, by using a minimum welding material, and are suited to such regenerating method of a cutting blade, its regenerating equipment, and the cutting blade for a shearing type grinding machine.

The invention claimed is:

1. A regenerating method of a cutting blade to be repaired, having a fixed part, and a blade tip projecting outwardly from the fixed part, the blade tip having a leading edge part pointed toward a rotational direction, and side edge parts at respective sides of the blade tip, the regenerating method comprising:

dividing a plurality of portions of the cutting blade into a plurality of groups depending on a degree of abrasion of each of the plurality of portions and a width dimension of each of the plurality of portions in a thickness direction of the blade tip, each of the plurality of groups including at least one section of one of the leading edge part and the side edge parts, chamfering the leading edge part and the side edge parts belonging to each of the plurality of groups, according to corresponding positions passing reference lines or reference planes as a reference of height of building up determined for each of the plurality of groups, welding the build-up on the chamfered leading edge part and side edge parts, and regenerating and processing each of the build-ups into a specified shape corresponding to a leading edge part and side edge parts in a predetermined state.

2. A cutting blade for a shearing grinding machine configured to be regenerated by the regenerating method of claim 1.

3. The regenerating method of a cutting blade according to claim 1, wherein the predetermined state is a state in which the cutting blade is unabraded.

4. The regenerating method of a cutting blade according to claim 1, further comprising:

preheating the chamfered cutting blade to a specified temperature, and after-heating the built up and welded cutting blade to a specified temperature, wherein, in the welding step, the welding is performed automatically by feeding continuously a hardening build-up welding material to the preheated and chamfered leading edge part and side edge parts, and wherein, in the regenerating and processing step, the after-heated and built-up and welded cutting blade is regenerated and processed.

5. The regenerating method of a cutting blade according to claim 1, wherein each of the side edge parts is orthogonal to the leading edge part.

6. The regenerating method of a cutting blade according to claim 1, wherein the cutting blade is one of two rotary blades respectively mounted on two parallel rotational shafts.

7. The regenerating method of a cutting blade according to claim 1, wherein:

each of the regenerated and processed build-ups on the side edge parts comprises a lateral build-up weld zone and an outer build-up weld zone, each of the lateral build-up weld zones of the regenerated and processed build-ups projects from a lateral side of the cutting blade and extends along the lateral side of the cutting blade in a vertical direction, each of the outer build-up weld zones of the regenerated and processed build-ups extends on an upper surface of a main body of the cutting blade, each of the outer build-up weld zones of the regenerated and processed build-ups is formed nearly on a same flat plane as the upper surface of the main body of the cutting blade, each of the regenerated and processed build-ups on the side edge parts has a first linear dimension defined from a terminal end point of the lateral build-up weld zone to a point that is coplanar with the upper surface of the main body of the cutting blade, and a second linear dimension defined from a terminal end point of the outer build-up weld zone to a point that is coplanar with the lateral side of the cutting blade, and the first linear dimension is 1 to 3 times the second linear dimension.

8. The regenerating method of a cutting blade according to claim 7, wherein the cutting blade is a split cutting blade detachably surrounding a blade base.

9. The regenerating method of a cutting blade according to claim 1, wherein the cutting blade is a split cutting blade detachably surrounding a blade base.

10. A regenerating method of a cutting blade to be repaired, having a fixed part, and a blade tip projecting outwardly from the fixed part, the blade tip having a leading edge part pointed toward a rotational direction, and side edge parts at respective sides of the blade tip, the regenerating method comprising:

dividing a plurality of portions of the cutting blade into a plurality of groups depending on a degree of abrasion of each of the plurality of portions and a width dimension of each of the plurality of portions in a thickness direction of the blade tip, each of the plurality of groups including at least one section of one of the leading edge part and the side edge parts, judging if any of the portions of the cutting blade is not reparable, chamfering the leading edge part and the side edge parts belonging to each of the plurality of groups corresponding to the portions of the cutting blade that are reparable, according to corresponding positions passing reference lines or reference planes as a reference of height of building up determined for each of the plurality of groups corresponding to the portions of the cutting blade that are reparable, welding the build-up on the chamfered leading edge part and side edge parts, and regenerating and processing each of the build-ups into a specified shape corresponding to a leading edge part and side edge parts in a predetermined state.

11. A cutting blade for a shearing grinding machine configured to be regenerated by the regenerating method of claim 10.

12. The regenerating method of a cutting blade according to claim 10, further comprising:

preheating the chamfered cutting blade to a specified temperature, and after-heating the built up and welded cutting blade to a specified temperature, wherein, in the welding step, the welding is performed automatically by feeding continuously a hardening build-up welding material to the preheated and chamfered leading edge part and side edge parts, and wherein, in the regenerating and processing step, the after-heated and built-up and welded cutting blade is regenerated and processed.

13. The regenerating method of a cutting blade according to claim 10, wherein:

each of the regenerated and processed build-ups on the side edge parts comprises a lateral build-up weld zone and an outer build-up weld zone, each of the lateral build-up weld zones of the regenerated and processed build-ups projects from a lateral side of the cutting blade and extends along the lateral side of the cutting blade in a vertical direction, each of the outer build-up weld zones of the regenerated and processed build-ups extends on an upper surface of a main body of the cutting blade, each of the outer build-up weld zones of the regenerated and processed build-ups is formed nearly on a same flat plane as the upper surface of the main body of the cutting blade, each of the regenerated and processed build-ups on the side edge parts has a first linear dimension defined from a terminal end point of the lateral build-up weld zone to a point that is coplanar with the upper surface of the main body of the cutting blade, and a second linear dimension defined from a terminal end point of the outer build-up weld zone to a point that is coplanar with the lateral side of the cutting blade, and the first linear dimension is 1 to 3 times the second linear dimension.

14. The regenerating method of a cutting blade according to claim 13, wherein the cutting blade is a split cutting blade detachably surrounding a blade base.

15. The regenerating method of a cutting blade according to claim 10, wherein the cutting blade is a split cutting blade detachably surrounding a blade base.

16. The regenerating method of a cutting blade according to claim 7, wherein the upper surface of the main body of the cutting blade is orthogonal to the lateral side of the cutting blade.

17. The regenerating method of a cutting blade according to claim 16, wherein:

each of the outer build-up weld zones of the regenerated and processed build-ups has an upper surface that is formed nearly on the same flat plane as the upper surface of the main body of the cutting blade, each of the lateral build-up weld zones of the regenerated and processed build-ups has a first surface in contact with the main body of the cutting blade and a second surface parallel to the first surface, and the upper surfaces of the outer build-up weld zones of the regenerated and processed build-ups are orthogonal to the second surfaces of the lateral build-up weld zones of the regenerated and processed build-ups, respectively.

* * * * *